United States Patent
Kim et al.

(10) Patent No.: US 11,423,687 B2
(45) Date of Patent: Aug. 23, 2022

(54) ELECTRONIC DEVICE INCLUDING POINT DETECTOR AND BIOMETRIC INFORMATION OBTAINING METHOD USING THE SAME

(71) Applicant: Samsung Electronics Co., Ltd., Gyeonggi-do (KR)

(72) Inventors: Jinho Kim, Gyeonggi-do (KR); Bongjae Rhee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/025,050

(22) Filed: Sep. 18, 2020

(65) Prior Publication Data
US 2021/0110130 A1 Apr. 15, 2021

(30) Foreign Application Priority Data
Oct. 11, 2019 (KR) .......................... 10-2019-0126271

(51) Int. Cl.
| | | |
|---|---|---|
| *G06V 40/13* | (2022.01) | |
| *G06F 3/041* | (2006.01) | |
| *G06V 40/60* | (2022.01) | |
| *G06V 40/12* | (2022.01) | |

(52) U.S. Cl.
CPC ...... *G06V 40/1318* (2022.01); *G06F 3/04166* (2019.05); *G06V 40/1335* (2022.01); *G06V 40/67* (2022.01)

(58) Field of Classification Search
CPC ............. G06K 9/0004; G06K 9/00912; G06K 9/00026; G06K 9/00067; G06F 3/04166; G06F 3/0416; G06F 3/042; G06V 40/1318; G06V 40/1335; G06V 40/67; G06V 40/1347
See application file for complete search history.

(56) References Cited

U.S. PATENT DOCUMENTS

| | | |
|---|---|---|
| 8,285,010 B2 | 10/2012 | Rowe |
| 9,060,688 B2 | 1/2015 | Rowe |
| 10,579,854 B2 | 3/2020 | Choo et al. |
| 10,685,202 B2 | 6/2020 | Kim et al. |
| 10,713,512 B2 | 7/2020 | Kim et al. |
| 10,741,621 B2 | 8/2020 | Choo et al. |

(Continued)

FOREIGN PATENT DOCUMENTS

| | | |
|---|---|---|
| KR | 10-2018-0034750 | 4/2018 |
| KR | 1020180106527 | 10/2018 |

OTHER PUBLICATIONS

International Search Report dated Jan. 13, 2021 issued in counterpart application No. PCT/KR2020/012207, 9 pages.

*Primary Examiner* — Abhishek Sarma
(74) *Attorney, Agent, or Firm* — The Farrell Law Firm, P.C.

(57) ABSTRACT

An electronic device includes a display panel including at least one light source, a point detector disposed on one surface of the display panel or inside the display panel, and at least one processor operatively connected with the display panel and the point detector. The at least one processor is configured to cause the at least one light source to emit light in response to an object outside the display panel, detect, through the point detector, at least a portion of the emitted light reflected by at least a portion of the object, and obtain biometric information corresponding to the object based on the detection.

18 Claims, 28 Drawing Sheets

(56) References Cited

U.S. PATENT DOCUMENTS

| | | |
|---|---|---|
| 10,839,239 B2 | 11/2020 | Kim et al. |
| 11,295,109 B2 | 4/2022 | Kang et al. |
| 2008/0232653 A1 | 9/2008 | Rowe |
| 2013/0022248 A1 | 1/2013 | Rowe |
| 2018/0150671 A1 | 5/2018 | Choo et al. |
| 2018/0151641 A1 | 5/2018 | Choo et al. |
| 2018/0268232 A1 | 9/2018 | Kim et al. |
| 2018/0315803 A1 | 11/2018 | Jin et al. |
| 2019/0310724 A1* | 10/2019 | Yeke Yazdandoost ............ H01L 27/3211 |
| 2020/0019745 A1 | 1/2020 | Kang et al. |
| 2020/0327348 A1 | 10/2020 | Kim et al. |
| 2021/0042546 A1 | 2/2021 | Kim et al. |

* cited by examiner

ELECTRONIC DEVICE INCLUDING POINT DETECTOR AND BIOMETRIC INFORMATION OBTAINING METHOD USING THE SAME

CROSS-REFERENCE TO RELATED APPLICATION(S)

This application is based on and claims priority under 35 U.S.C. § 119(a) to Korean Patent Application No. 10-2019-0126271, filed on Oct. 11, 2019, in the Korean Intellectual Property Office, the disclosure of which is incorporated by reference herein in its entirety.

BACKGROUND

1. Field

The present disclosure relates generally to an electronic device including a point detector and a biometric information obtaining method using the same.

2. Description of the Related Art

Electronic devices are capable of supporting functions for obtaining biometric information. For example, the electronic devices are capable of supporting a fingerprint recognition function. A sensor that provides the fingerprint recognition function may be disposed on the lower periphery of a display region in the exterior of the electronic device, or on the back surface of the case of the electronic device, and the electronic device may support the fingerprint recognition function based on this.

In recent years, as more and more users prefer large screens, research has been continuously conducted to increase the screen size of portable electronic devices. For example, attempts to implement a large screen have been continuously made by disposing a sensor (e.g., a fingerprint sensor), which had been disposed in a non-display region (e.g., a bezel region) of the electronic device, in a display region of the display to reduce or remove the non-display region.

In order to increase the area of the display region of the display of the electronic device, the fingerprint sensor may be attached to the back surface of the display. When an in-display structure is implemented in which the fingerprint sensor is attached to the back surface of the display, the area of the non-display region, such as the bezel around the display region, may be minimized while the fingerprint sensor is disposed.

In addition, when the fingerprint sensor is attached to the back surface of the display, a light source for fingerprint recognition is not separately disposed, and a light source included in the display (e.g., a backlight unit (BLU), a light emitting diode (LED), or an organic light emitting diode (OLED)) may be used as a light source for the fingerprint sensor. Optical in-display fingerprint sensors in the related art may obtain the shape of the fingerprint as an image by simultaneously turning on light sources of the display at a position where the fingerprint is to be measured, focusing light reflected by the fingerprint through a focusing element such as a lens or pin hole array, and sensing the focused light by a photo detective sensor having a two dimensional (2D) array.

In order for the sensor to receive light reflecting off an object, a separate focusing element may be disposed between the display and the sensor. Specifically, the light reflecting off an activating object may be focused while passing through the focusing element before being incident on (i.e., appearing on) the sensor formed on the back surface of the display panel. The reflected light may have a size in a range where the focusing element is able to perform sensing. In electronic devices including a sensor in the related art, if a separate focusing element is not disposed, it may not be easy to sense reflected light.

Furthermore, a relatively expensive 2D array sensor is used in order to obtain information on the reflected position when sensing the light reflecting off the object. Accordingly, it may be difficult to reduce the cost of the sensor disposed on the back surface of the display.

SUMMARY

The present disclosure has been made to address the above-mentioned problems and disadvantages, and to provide at least the advantages described below.

According to an aspect of the disclosure, an electronic device includes a display panel including at least one light source, a point detector disposed on one surface of the display panel or inside the display panel, and at least one processor operatively connected with the display panel and the point detector, and the at least one processor may be configured to cause the at least one light source to emit light in response to an object outside the display panel, detect, through the point detector, at least a portion of the emitted light reflected by at least a portion of the object, and obtain biometric information corresponding to the object based on the detection.

According to another aspect of the disclosure, a biometric information obtaining method using an electronic device including a point detector includes emitting light in response to an object outside a display panel by at least one light source included in the display panel, detecting, through the point detector, at least a portion of the emitted light reflected by at least a portion of the object, and obtaining biometric information corresponding to the object based on the detection.

According to another aspect of the disclosure, a biometric information obtaining method of an electronic device includes checking whether an event in which a touch of a user is input to a display panel, if the event occurs, setting, as a first region, a position where the touch of the user has occurred on a first surface of the display panel, sequentially displaying a plurality of illumination patterns that are patterns for driving at least one pixel disposed on the first region according to a first period that is a specified period, and measuring an amount of light that is emitted from the display panel by the plurality of illumination patterns and is reflected by the first region to a point detector disposed on a second surface opposite to the first surface of the display panel.

BRIEF DESCRIPTION OF THE DRAWINGS

The above and other aspects, features, and advantages of certain embodiments of the present disclosure will be more apparent from the following description taken in conjunction with the accompanying drawings, in which.

With respect to the description of the drawings, the same or similar reference signs may be used for the same or similar elements.

DETAILED DESCRIPTION

Hereinafter, various embodiments disclosed in the present disclosure will be described with reference to the accompanying drawings. However, this is not intended to limit the present disclosure to the specific embodiments, and it is to be construed to include various modifications, equivalents, and/or alternatives of embodiments of the present disclosure.

According to embodiments disclosed in the present disclosure, provided are a display module including a display and sensor coupling structure, and an electronic device including the display module, which are capable of biometric recognition using only a point detector without using an additional focusing element.

According to embodiments disclosed in the present disclosure, it is possible to easily measure biometric information by measuring, by the point detector, the light produced by reflecting, from the object, the light emitted from the light source activation pattern that changes sequentially at a specified period using the light source of the display panel.

According to the embodiments disclosed in the present disclosure, it is possible to obtain a high resolution image related to biometric information without performing an additional configuration by scanning the object using the light source disposed on the display panel.

According to embodiments disclosed in the present disclosure, since there are no additional optical parts except for the point detector in the light receiving part where the light reflecting off the object is detected, it is possible to implement an ultra-thin and low-cost in-display sensing structure.

Various effects may be provided that are directly or indirectly identified through the present disclosure.

Figure 1:
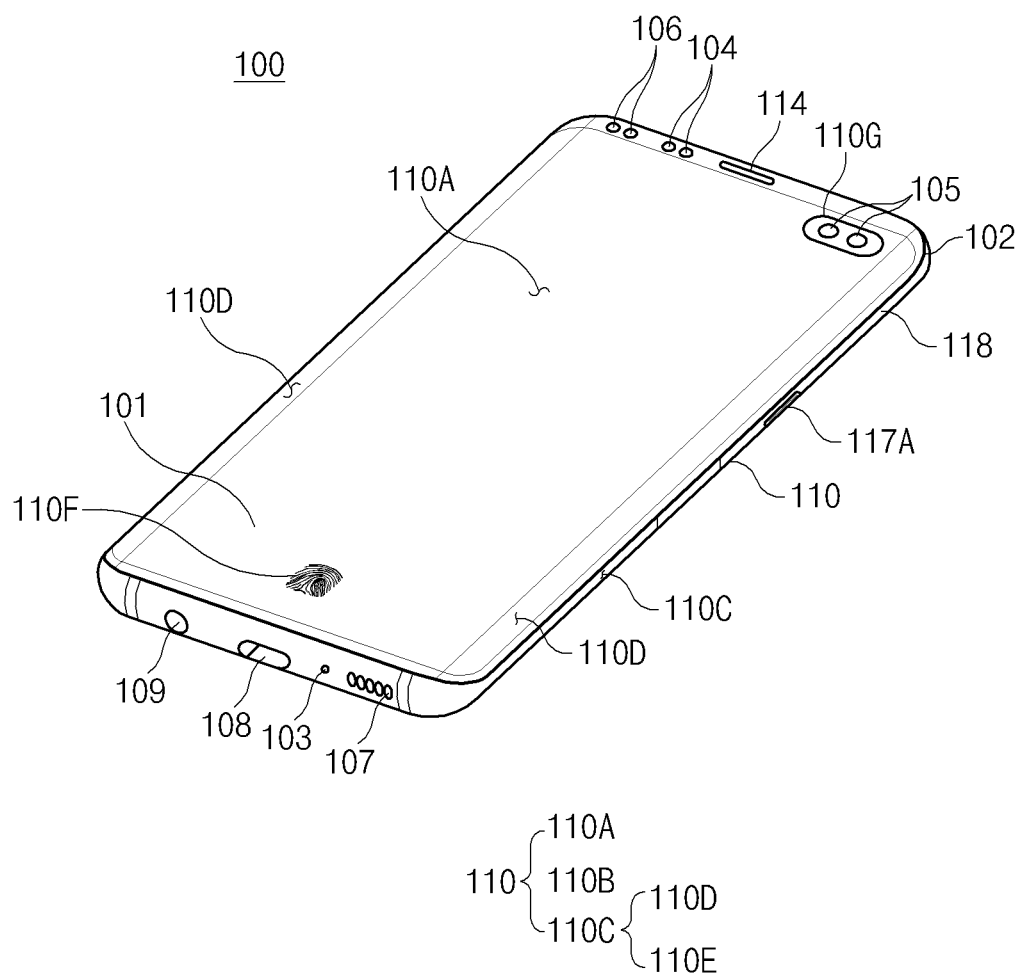
FIG. 1 is a front perspective view of an electronic device, according to an embodiment.
Figure 2:
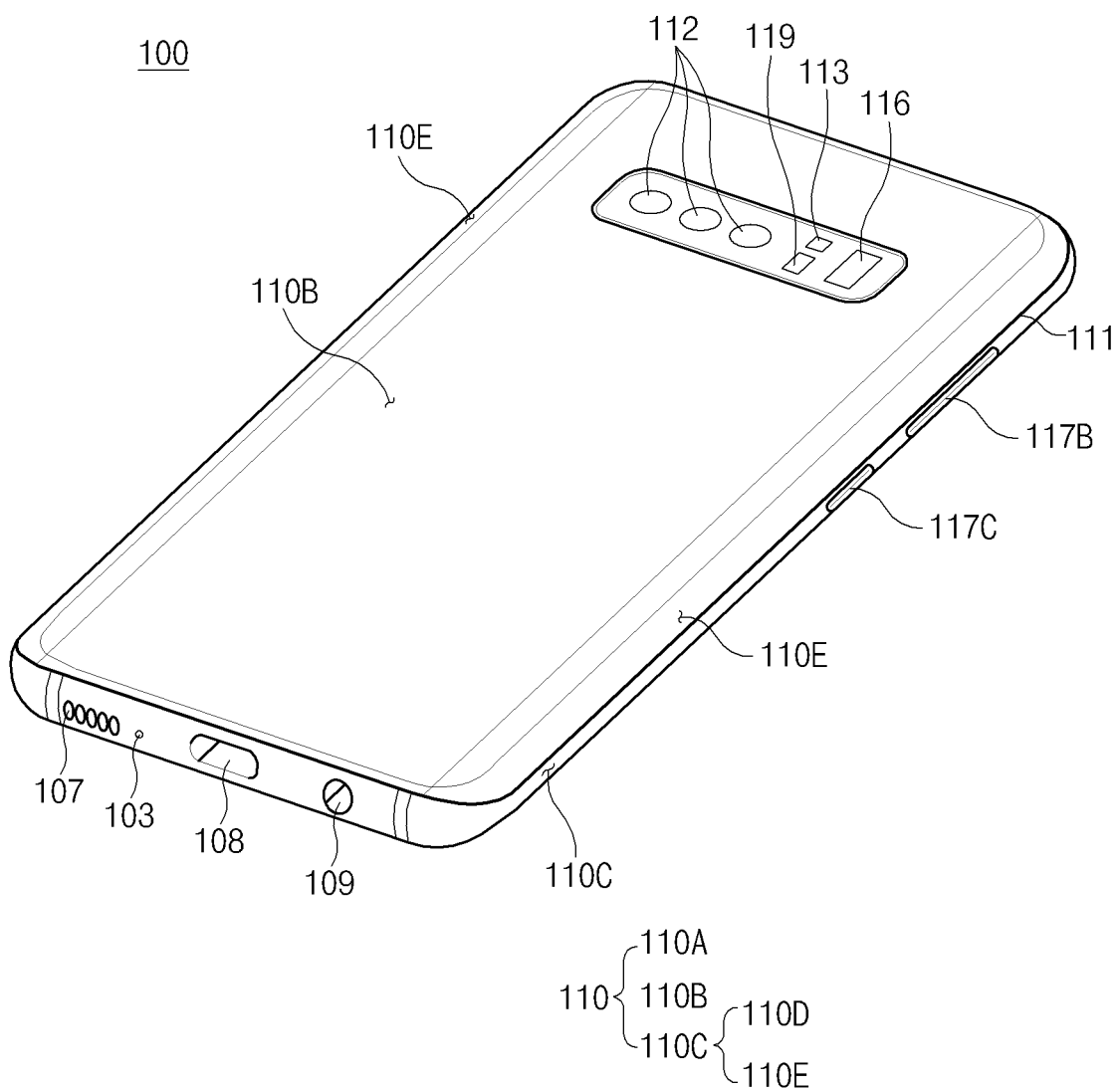
FIG. 2 is a rear perspective view of the electronic device illustrated in FIG. 1, according to an embodiment.

FIG. 1 is a front perspective view of an electronic device, according to an embodiment. FIG. 2 is a rear perspective view of the electronic device illustrated in FIG. 1, according to an embodiment.

Referring to FIGS. 1 and 2, an electronic device 100 includes a housing 110 including a first surface (or front surface) 110A, a second surface (or back surface) 110B, and a side surface 110C surrounding a space between the first surface 110A and the second surface 110B.

The housing 110 may refer to a structure forming a portion of the first surface 110A, the second surface 110B, and the side surface 110C of FIG. 1.

The first surface 110A may be formed by a front plate 102 (e.g., a glass plate or a polymer plate including various coating layers) that is at least partially substantially transparent. The second surface 110B may be formed by a back plate 111 that is substantially opaque. The back plate 111 may be formed, for example, by coated or colored glass, ceramic, polymer, metal (e.g., aluminum, stainless steel (STS), or magnesium), or a combination of at least two of the above materials. The side surface 110C may be coupled with the front plate 102 and the back plate 111 and may be formed by a side bezel structure (or a "side member") 118 that includes metal and/or polymer.

The back plate 111 and the side bezel structure 118 may be integrally formed and may include the same material (e.g., a metal material such as aluminum).

The front plate 102 may include two first regions 110D that are curved from the first surface 110A toward the back plate 111 and extend seamlessly at both long edges of the front plate 102.

The back plate 111 may include two second regions 110E that are curved from the second surface 110B toward the front plate 102 and extend seamlessly at both long edges.

The front plate 102 or the back plate 111 may include only one of the first regions 110D or the second regions 110E. The front plate 102 or the back plate 111 may not include some of the first regions 110D or the second regions 110E.

When viewed from the side of the electronic device 100, the side bezel structure 118 may have a first thickness (or width) on the sides (e.g., short sides) where the first regions 110D or the second regions 110E as described above are not included, and may have a second thickness thinner than the first thickness on the sides (e.g., long sides) where the first region 110D or the second region 110E are included.

The electronic device 100 may include at least one or more of a display 101, audio modules 103, 107, and 114, sensor modules 104, 116 and 119, camera modules 105, 112, and 113, key input devices 117A, 117B, and 117C, a light emitting element 106, and connector holes 108 and 109. The electronic device 100 may omit at least one of the components (e.g., key input devices 117A, 117B, and 117C, or the light emitting element 106) or may additionally include other components.

The display 101 may be exposed through a significant portion of the front plate 102. At least a portion of the display 101 may be exposed through the front plate 102 including the first surface 110A and the first regions 110D of the side surface 110C.

The edge of the display 101 may be formed to be substantially the same as the outer edge of the front plate 102 adjacent to the edge. In order to expand the area where the display 101 is exposed, the distance between the outer edge of the display 101 and the outer edge of the front plate 102 may be formed to be substantially the same as each other.

The surface of the housing 110 or the front plate 102 may include a screen display region formed by visually exposing the display 101. The screen display region may include the first surface 110A and the first region 110D of the side surface.

The first surface 110A and the first region 110D may include a sensing region 110F configured to obtain biometric information of a user. The phrase "the first surface 110A and the first region 110D includes the sensing region 110F" means that at least a portion of the sensing region 110F may be overlapped with the first surface 110A and the first region 110D. In other words, the sensing region 110F may mean a region in which visual information may be displayed by the display 101 like other regions of the first surface 110A and the first region 110D, and additionally, biometric information (e.g., fingerprint information) of the user may be obtained.

The first surface 110A and the first region 110D of the display 101 may include a region 110G to which the first camera device 105 (e.g., a punch hole camera) may be visually exposed. In the region 110G where the first camera device 105 is exposed, at least a portion of the edge may be surrounded by the first surface 110A and the first region 110D. The first camera device 105 may include a plurality of camera devices.

In a portion of the first surface 111A and the first region 110D of the display 101, a recess or opening may be formed, and at least one or more of an audio module 114, the first sensor module 104, and the light emitting element 106, which are aligned with the recess or the opening may be formed.

The display 101 may include, on the back of the first surface 111A and the first region 110D, the audio module 114, the sensor modules 104, 116, and 119, and the light emitting element 106.

The display 101 may be coupled with or disposed adjacent to a touch sensing circuit, a pressure sensor capable of measuring the intensity (pressure) of the touch, and/or a digitizer detecting a magnetic field type stylus pen.

At least some of the sensor modules 104, 116, and 119, and/or at least some of the key input devices 117A, 117B, and 117C may be disposed on the side surface 110C, the first regions 110D and/or the second regions 110E.

The audio modules 103, 107, and 114 may correspond to a microphone hole (e.g., audio module 103) and speaker holes (e.g., audio module 107 and 114). At the microphone hole, a microphone for acquiring external sound may be disposed inside, and in some embodiments, a plurality of microphones may be disposed to sense the direction of sound. The speaker holes may include an external speaker hole and a call receiver hole. The speaker holes and the microphone hole may be implemented as one hole, or a speaker may be included without the speaker holes (e.g., implemented as a piezo speaker).

The sensor modules 104, 116, and 119 may generate an electrical signal or data value corresponding to an internal operational state (e.g., power or temperature) of the electronic device 100 or an external environmental state of the electronic device 100.

For example, the sensor modules 104, 116, and 119 may include a proximity sensor (e.g., sensor module 104) disposed on the first surface 110A of the housing 110, a time of flight (TOF) camera device (e.g., sensor module 116) disposed on the second surface 110B of the housing 110, a heart rate monitor (HRM) sensor (e.g., sensor module 119) disposed on the second surface 110B of the housing 110, and/or a fingerprint sensor (e.g., sensor 190 of FIG. 3) coupled to the display 101.

The second sensor module 116 may include the time-of-flight (TOF) camera device for distance measurement.

At least a portion of the fourth sensor module (e.g., the sensor 190 of FIG. 3) may be disposed below the first surface 110A and the first region 110D. The fourth sensor module may be disposed in a recess 139 formed on the back surface of the display 101. That is, the fourth sensor module may not be exposed on the first surface 110A and the first region 110D, and the sensing region 110F may be formed on at least a portion of the first surface 110A and the first region 110D.

The fingerprint sensor may be disposed on the second surface 110B as well as on the first surface 110A of the housing 110.

The electronic device 100 may further include a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and/or an illuminance sensor.

The camera modules 105, 112, and 113 may include a first camera device (e.g., camera module 105), such as a punch hole camera device, exposed on the first surface 110A of the electronic device 100, and a second camera device (e.g., camera module 112) and/or a flash (e.g., camera module 113) exposed on the second surface 110B.

The first camera device may be exposed through a portion of the first region 110D of the first surface 110A. For example, the first camera device may be exposed on a portion of the first region 110D through an opening formed in a portion of the display 101.

The second camera device may include a plurality of camera devices (e.g., dual cameras or triple cameras). However, the second camera device is not necessarily limited to including a plurality of camera devices, and may include a single camera device.

Camera modules 105 and 112 may include one or more lenses, an image sensor, and/or an image signal processor (ISP). Camera module 113 may be a flash device and may include, for example, a light emitting diode or a xenon lamp. Two or more lenses (IR camera lenses, wide-angle and telephoto lenses) and image sensors may be disposed on one surface of the electronic device 100.

The key input devices 117A, 117B, and 117C may be disposed on the side surface 110C of the housing 110. The electronic device 100 may not include some or all of the above-mentioned key input devices 117A, 117B, and 117C, and the key input devices 117A, 117B, and 117C which are not included may be implemented in other forms, such as a soft key, on the display 101. The key input device may include a sensor 190 forming the sensing region 110F included in the first surface 110A and the first region 110D.

The light emitting element 106 may be disposed on the first surface 111A of the housing 110. The light emitting element 106 may provide state information of the electronic device 100 in the form of light. In addition, the light emitting element 106 may provide a light source interlocked with the operation of the first camera device 105. The light emitting element 106 may include an LED, an IR LED, and a xenon lamp.

The connector holes 108 and 109 may include a first connector hole (e.g., connector hole 108) capable of accommodating a connector (for example, a universal serial bus (USB) connector) for transmitting and receiving electric power and/or data to and from an external electronic device, and/or a second connector hole (e.g., connector hole 109), such as an earphone jack, capable of receiving a connector for transmitting and receiving audio signals to and from an external electronic device.

Figure 3:
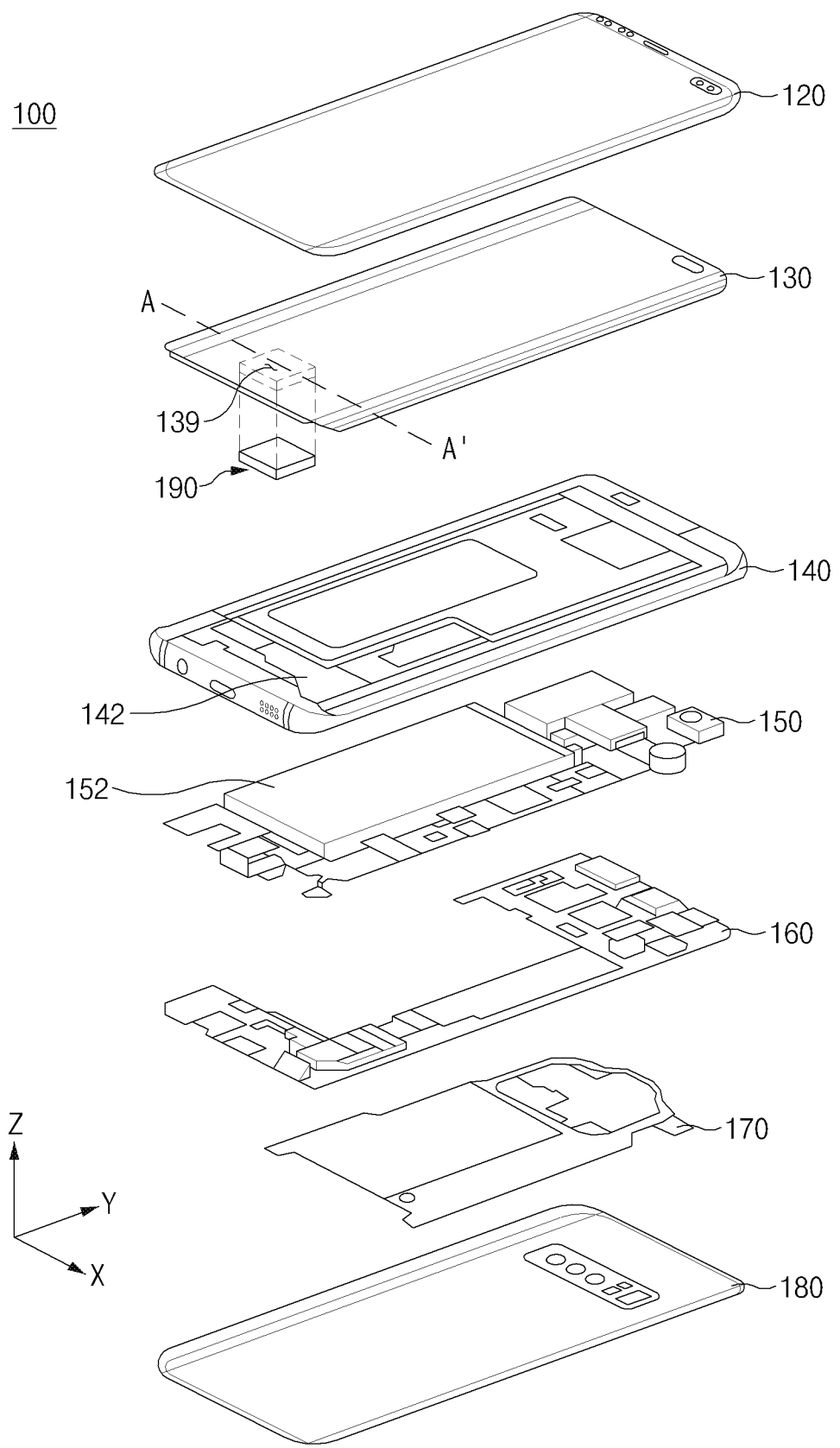
FIG. 3 is an exploded perspective view of the electronic device illustrated in FIG. 1, according to an embodiment.

FIG. 3 is an exploded perspective view of the electronic device illustrated in FIG. 1, according to an embodiment.

Referring to FIG. 3, the electronic device 100 includes a side member 140, a first support member 142 (e.g., a bracket), a front plate 120, a display 130, a printed circuit board 150, a battery 152, a second support member 160 (e.g., a rear case), an antenna 170, and a back plate 180. The electronic device 100 may omit at least one of the components (e.g., the first support member 142 or the second support member 160) or may additionally include other components. At least one of the components of the electronic device 100 may be the same as or similar to at least one of the components of the electronic device 100 of FIG. 1 or FIG. 2, and the description thereof may be omitted.

The first support member 142 may be disposed inside the electronic device 100 to be connected to the side member 140 or may be integrally formed with the side member 140. The first support member 142 may be formed of, for example, a metal material and/or a non-metal (e.g., polymer) material. The first support member 142 may have a display 130 coupled to one surface and the printed circuit board 150 coupled to the other surface. The printed circuit board 150 may be equipped with a processor, memory, and/or interface. The processor may include, for example, one or more of a central processing unit (CPU), an application processor (AP), a graphic processing unit (GPU), an ISP, a sensor hub processor, or a communication processor (CP).

The memory may include, for example, a volatile memory or a non-volatile memory.

The interface may include, for example, a high definition multimedia interface (HDMI), a USB interface, a secure digital (SD) card interface, and/or an audio interface. The interface may electrically or physically connect the electronic device 100 with an external electronic device and may include a USB connector, an SD card, a multimedia card (MMC) connector, or an audio connector.

The battery 152 may supply power to at least one component of the electronic device 100, and may include, for example, a primary cell which is not rechargeable, a secondary cell which is rechargeable, or a fuel cell. At least a portion of the battery 152 may be disposed, for example, on substantially the same plane as the printed circuit board 150. The battery 152 may be integrally disposed inside the electronic device 100 or may be disposed to be detachable from the electronic device 100.

The antenna 170 may be disposed between the back plate 180 and the battery 152. The antenna 170 may include, for example, a near field communication (NFC) antenna, a wireless charging antenna, and/or a magnetic secure transmission (MST) antenna. The antenna 170 may, for example, perform short-range communication with an external device, or may wirelessly transmit and receive power required for charging. The antenna structure may be formed by the side member 140 and/or a portion of the first support member 142 or a combination thereof.

The electronic device 100 may further include a sensor 190 coupled to the display 130. The sensor 190 may be disposed on a recess 139 formed on the back surface of the display 130. The sensor 190 may form a sensing region 110F on a portion of the first plate 120.

Figure 4:
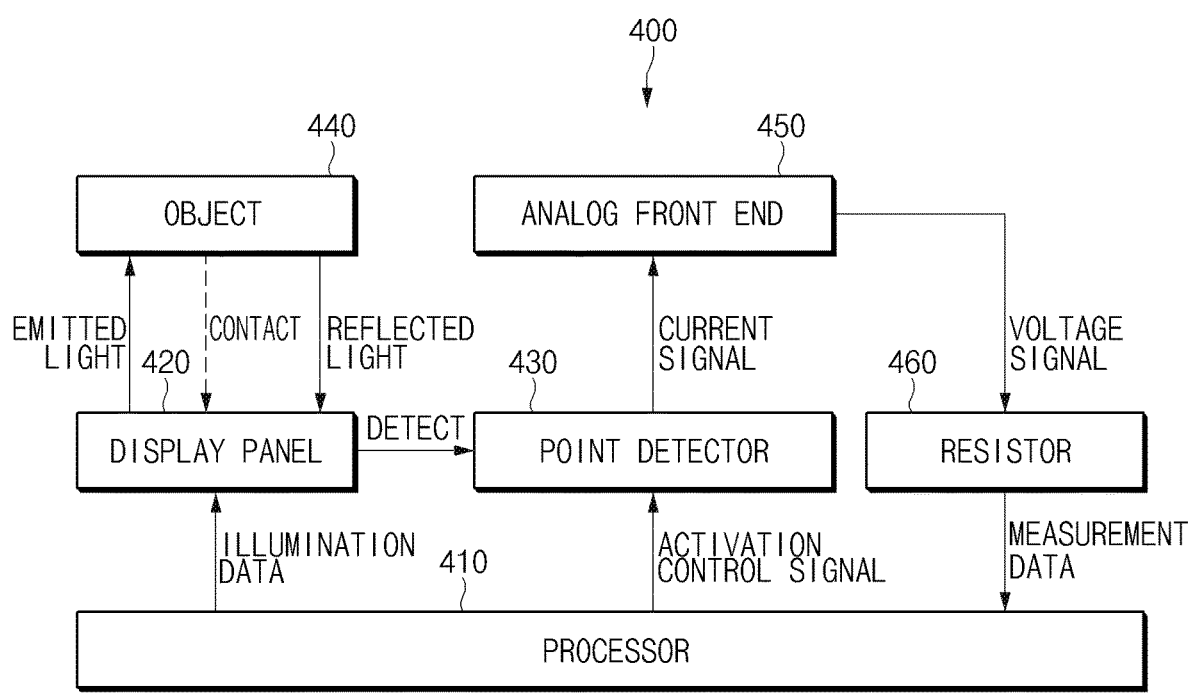
FIG. 4 is a block diagram illustrating an electronic device for obtaining biometric information, according to an embodiment.

FIG. 4 is a block diagram 400 illustrating an electronic device 100 for obtaining biometric information, according to an embodiment. The block diagram 400 illustrating the electronic device 100 includes a processor 410, a display panel 420, and a point detector 430. According to an embodiment, the sensor 190 of FIG. 3 may be a point detector.

Referring to FIG. 4, the processor 410 may be operatively connected to the display panel 420 and the point detector 430. The processor 410 may provide illumination data to the display panel 420. The illumination data may set the position where the display panel 420 emits light, the amount of light emitted, and/or the timing at which light is emitted. The processor 410 may provide an activation control signal to the point detector 430. The activation control signal may set the timing at which the point detector 430 is activated. The processor 410 may be configured to synchronize the operation timing of the specific light source with the operation timing of the specific point detector 430.

The display panel 420 may display images. The display panel 420 may emit light in order to display images. The display panel 420 may include at least one light source for emitting light. The at least one light source may be disposed on the display panel 420 in an array structure.

The point detector 430 may be disposed on one surface of the display panel 420. The point detector 430 may be distributed on the display panel 420 in the form of an array. The point detector 430 may detect light reflecting off the object 440 toward the display panel 420. The point detector 430 may be a photo diode. The point detector 430 may detect at least a portion of reflected light that is emitted through the display panel 420, is reflected by at least a portion of the external object 440, and is introduced into the display panel 420.

The electronic device 100 may further include a register 460. The register 460 may be a memory. The register 460 may record the amount of reflected light detected when a specific light source is turned on. The processor 410 may obtain a value related to the amount of reflected light stored in the register. The processor 410 may reconstruct biometric information related to the object 440. If the object 440 is the finger of the user, the processor 410 may reconstruct an image of the fingerprint based on the amount of reflected light received from the register 460.

The processor 410 may set emission light of the display panel 420 by transmitting light emission data to the display panel 420 in response to the contact of the object 440 outside the display panel 420 with the display panel 420. The processor 410 may set an illumination pattern of the display panel 420. If the object 440 is the finger of the user, when fingerprint measurement is started, the processor 410 may set the measurement range of the fingerprint based on the fingerprint information from the touch sensor disposed on the display panel 420. The processor 410 may transmit, to the display panel 420, a first illumination pattern that operates at least one light source within the measurement range. For example, the first illumination pattern may be a pattern in which one pixel disposed on the display panel 420 is activated. The first illumination pattern may be a pattern in which a plurality of pixels are activated in a specific shape.

The processor 410 may provide an activation control signal to the point detector 430 in response to the object 440 outside the display panel 420 contacting the display panel 420. If the point detector 430 is formed in an array composed of one or more, the processor 410 may supply the activation control signal to the point detector 430 disposed on the region of the display panel 420 contacted by the object 440. The processor 410 of the electronic device 100 may control the point detector 430 corresponding to the light source of the display panel 420. The processor 410 of the electronic device 100 may detect an area where the finger of the user touches the display panel 420 and may perform control such that some pixels of the display panel 420 corresponding to the area are used as light sources. The processor 410 of the electronic device 100 may be configured to interlock the corresponding point detector 430 with the light source to detect the light that is emitted from the light source, is reflected by at least a portion of the finger of the user, and is introduced back into the display panel 420.

The processor 410 may selectively operate the point detector 430 to correspond to the emission timing of the first illumination pattern and the shape of the first illumination pattern. The processor 410 may activate the point detector 430 to detect the light reflecting off the object 440 while the first illumination pattern continues. The processor 410 may activate the point detector 430 disposed at a position where the first illumination pattern is overlapped with the display panel 420 when the electronic device 100 is viewed from above. The point detector 430 may be activated which is overlapped with at least one pixel emitting light when the electronic device 100 is viewed from above.

The point detector 430 may include a plurality of point detectors. The processor 410 may activate the plurality of point detectors disposed at a position that is overlapped with the first illumination pattern when the display panel 420 is viewed from outside of the electronic device 100 and from above (e.g., when viewed from outside of the electronic device 100 in the −Z-axis direction based on the X, Y, and Z axes of FIG. 3), and in the peripheral regions of the first illumination pattern.

The point detector 430 may convert the detected reflected light into a current signal. The point detector 430 may generate a current signal according to the amount of light produced by reflecting, from the object 440, the light emitted from the display panel 420 by the first illumination pattern. The current signal may be converted into a voltage signal at an analog front end (AFE) 450. The value of the voltage signal may be recorded in the register 460 as measurement data. The processor 410 may obtain measurement data stored in the register 460.

The processor 410 may transmit a second illumination pattern to the display panel 420 after the first period, which is a specified period, has elapsed. The processor 410 may receive measurement data corresponding to different illumination patterns for each specified period. The processor 410 may measure voltage signals corresponding to reflected light corresponding to different illumination patterns until the entire region within the biometric information measurement range is scanned. The processor 410 may form an image related to biometric information in the biometric information measurement range by reflecting stored information on the reflected light and information on the reflected position regarding each illumination pattern, when the measurement of the region within the biometric information measurement range is completed.

Figure 5:
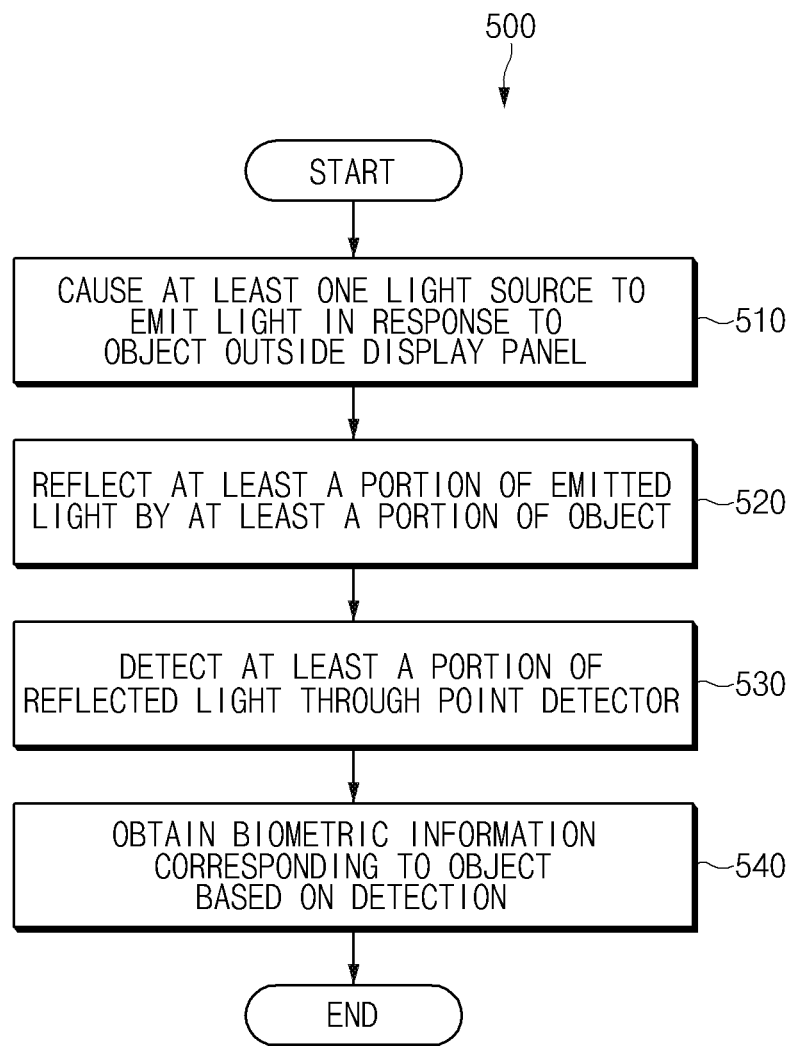
FIG. 5 is a flowchart illustrating a method of obtaining biometric information by an electronic device, according to an embodiment.

FIG. 5 is a flowchart 500 illustrating a method of obtaining biometric information by an electronic device 100, according to an embodiment.

Referring to FIG. 5, in step 510, an electronic device 100 causes at least one light source to emit light in response to the object 440 outside the display panel 420 contacting the display panel 420. At least one light source may be a pixel disposed on the display panel 420. The processor 410 may be configured to, when the object 440 comes into contact with one surface of the display panel 420, cause the light source disposed corresponding to the region contacted by the object 440 to emit light toward the object 440.

In step 520, in the electronic device 100, at least a portion of the emitted light is reflected by at least a portion of the object 440. A portion of the light emitted from the light source may be reflected toward the display panel 420 corresponding to the reflectivity of the object 440.

In step 530, the electronic device 100 detects at least a portion of the reflected light through a point detector 430. The point detector 430 may detect the amount of reflected light.

In step 540, the electronic device 100 obtains biometric information corresponding to the object 440 based on the detection. The point detector 430 may calculate the light reflectivity of the object 440 according to the amount of detected light. The point detector 430 may generate measurement data including the shape and/or surface characteristics of the object 440 based on the calculated light reflectivity. The processor 410 may obtain biometric information including the shape and/or surface characteristics of the object based on the measurement data. If the object 440 is a human finger, the reflection of light may occur differently depending on ridges and valleys of the fingerprint included in the finger. If the light reflecting off the ridge portion, which contacts the outer part of the display panel 420, and the light reflecting off the valley, which is a non-contact surface, are measured, the data value may be different. The processor 410 may obtain information about the fingerprint of the user based on the difference in the obtained data values.

Figure 6A:
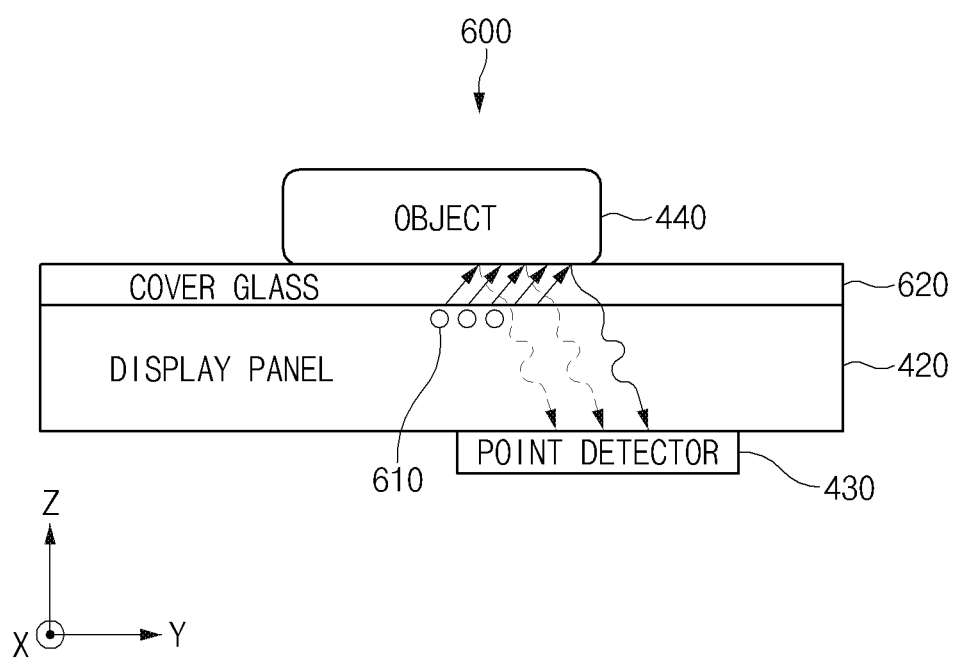
FIG. 6A is a diagram illustrating an electronic device that detects light reflecting off an object through a point detector, according to an embodiment.

FIG. 6A is a diagram 600 illustrating an electronic device 100 that detects light reflecting off the object 440 through the point detector 430, according to an embodiment.

Referring to FIG. 6A, a scanning type optical in-display biometric information sensing structure may be implemented using at least one light source 610 disposed on the display panel 420 and the point detector 430 disposed on one surface of the display panel 420. The at least one light source 610 may be a pixel disposed on the display panel 420. The at least one light source 610 may be sequentially activated to correspond to a light source activation pattern set by a processor 410.

The processor 410 may know in advance the position coordinates of a pixel from which light is emitted on the display panel 420. The processor 410 may know in advance coordinate information related to a reflected position of the reflected light that is the light emitted and then is reflected by the object 440. The point detector 430 may obtain information related to the amount of reflected light except for the coordinate information related to the reflected position of the reflected light. The point detector 430 may be implemented as a single photodiode to detect the amount of light reflecting off from the object 440. If the at least one light source 610 is activated in the form of an illumination pattern set by the processor 410, the point detector 430 may detect the amount of light that is produced by reflecting the emitted light from the object 440 and passes through the display panel 420.

The size of the point detector 430 may be a first size that is a size of a rectangular inner region having a length of about 1 millimeter (mm) in each of the length and width directions of the display panel 420. The sensitivity of the point detector may be increased, and thus the number of the point detectors 430 to be disposed to detect light reflecting off a region with the same size may be less than the number of pixels of a 2D array detector.

At least a portion of the light reflecting off the object 440 may be scattered while passing through a cover glass 620 and the display panel 420. Since the point detector 430 obtains the biometric information of the object 440 using information on the amount of reflected light, whether the reflected light is scattered may be independent of obtaining the biometric information of the object 440. Accordingly, the influence of noise which is information other than biometric information due to scattering by the display panel 420 may be reduced.

An image sensor (e.g., a 2D array detector) used to optically detect light may be vulnerable to noise when the reflected light is scattered. For example, the amount of reflected light reaching the periphery of the image sensor is made smaller, and thus it is likely that the sharpness of some regions is deteriorated in obtaining an image as a whole. For the point detector 430, since the size of the point detector 430 is larger than the unit pixel size of the 2D array detector, even if the reflected light is scattered and the direction of the reflected light is changed, the point detector 430 may obtain the reflected light more accurately. In addition, since the point detector 430 detects only the information on the amount of reflected light, the sensitivity of the point detector related to the information on the amount of reflected light may be higher than the sensitivity of the 2D array detector. Furthermore, since the point detector 430 transmits only the information on the amount of the reflected light, the point detector 430 may transmit measurement data to the processor 410 faster than the 2D array detector transmitting information on position coordinate of the reflected light and information on the amount of the reflected light. For example, the transmission rate of the measurement data is about 30 frames per second (FPS) for the 2D array detector, whereas it may be about 10,000 FPS or higher for the point detector 430.

Figure 6B:
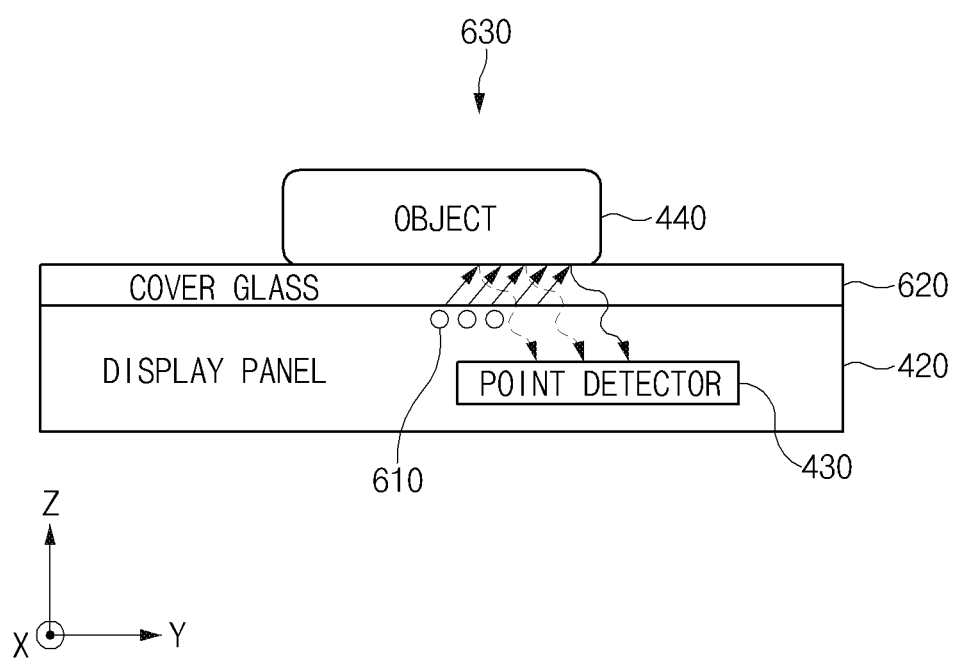
FIG. 6B is a diagram illustrating an electronic device that detects light reflecting off an object through a point detector, according to an embodiment.

FIG. 6B is a diagram illustrating an electronic device that detects light reflecting off an object through a point detector, according to an embodiment.

Referring to FIG. 6B, the point detector 430 is disposed inside the display panel 420. The point detector 430 may have an in-pixel structure, where the point detector 430 is inserted inside the display panel 420. For example, point detect (PD) pixels included in the point detector 430 may be disposed between red green blue (RGB) pixels of the display panel 420. In this case, each of the PD pixels may be electrically connected to functionally form the point detector 430.

The point detector 430 may have an under-pixel structure in which the point detector 430 is disposed on a lower layer of the display panel. The point detector 430 may be included in a layer disposed below a layer on which RGB pixels of the display panel 420 are disposed.

The point detector 430 may have an over-pixel structure in which the point detector 430 is disposed on an upper layer of the display panel 420. The point detector 430 may be included in a layer disposed over a layer on which RGB pixels of the display panel 420 are disposed. The point detector 430 may be a transparent point detector 430, such as an organic PD, in order to prevent light emitted from RGB pixels from being blocked.

Figure 6C:
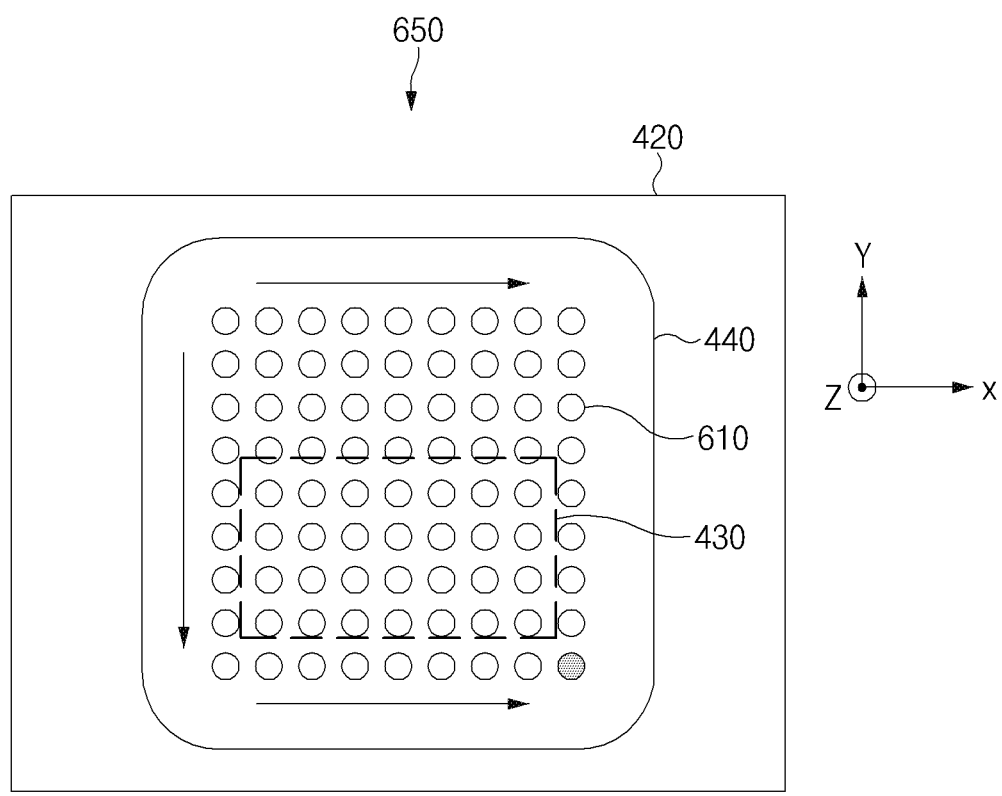
FIG. 6C is a diagram illustrating an electronic device that detects light reflecting off an object through a point detector, according to an embodiment.

FIG. 6C is a diagram 650 illustrating an electronic device 100 that detects light reflecting off the object 440 through the point detector 430, according to an embodiment. FIG. 6C may be a plan view of the electronic device 100, which is substantially same as that of FIG. 6A, when viewed from the front of the display panel 420.

Referring to FIG. 6C, the object 440 (e.g., the finger of the user) contacts at least a portion of a cover glass 620 disposed on the display panel 420 (e.g., a +Z direction of FIG. 6A). A processor 410 may be configured to check the position contacted by the object 440 using the touch sensor disposed on the display panel 420. The processor 410 may determine the first region including at least one light source 610 corresponding to a contact position where at least a portion of the object 440 is in contact with at least a portion of the outer portion of the electronic device 100. The processor 410 may be configured to activate at least one light source 610 corresponding to the light source activation pattern every first period, which is a specified period. The processor 410 may transmit, to a register 460, information on the amount of reflected light detected by the point detector 430 in synchronization with the timing at which the at least one light source 610 is activated.

Even if the light reflecting off the object 440 changes direction or is scattered while passing through the display panel 420, the amount of the reflected light may be detected by the point detector 430 if the reflected light reaches the point detector 430. The point detector 430 may detect the amount of reflected light without loss and/or distortion, unlike the general image sensor (e.g., a 2D array detector) used to measure reflected light, thereby obtaining more accurate biometric information.

Figure 7A:
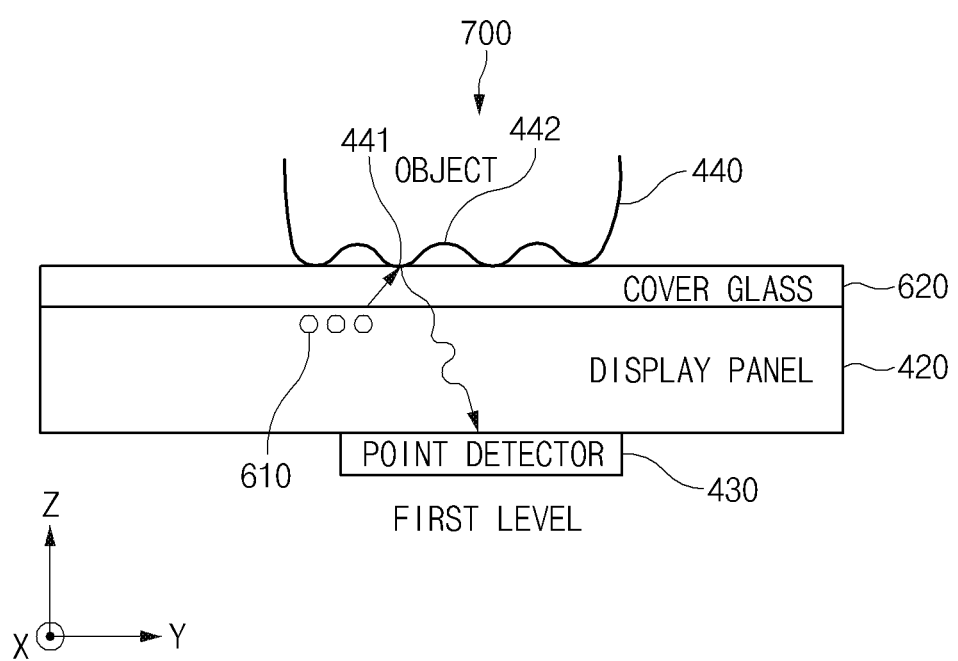
FIG. 7A is a diagram illustrating an electronic device that detects light reflecting off a first portion of an object through a point detector, according to an embodiment.
Figure 7B:
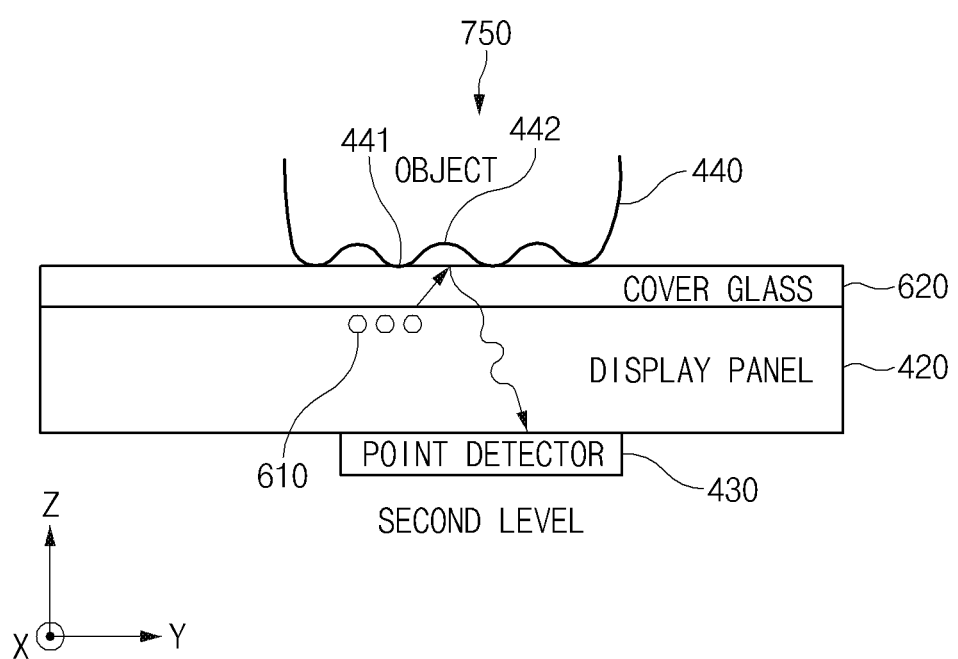
FIG. 7B is a diagram illustrating an electronic device that detects light reflecting off a second portion of the object through the point detector, according to an embodiment.

FIG. 7A is a diagram 700 illustrating an electronic device 100 that detects light reflecting off a first portion 441 of the object 440 through the point detector 430, according to an embodiment. FIG. 7B is a diagram 750 illustrating an electronic device 100 that detects light reflecting off a second portion 442 of the object 440 through the point detector 430, according to an embodiment.

Referring to FIGS. 7A and 7B, the surface shape of the object 440 may not be uniform. For example, the object 440 may include a convex part and a concave part. For example, if the object 440 is the finger of the user, the convex part and the concave part may be included depending on the curved shape of the fingerprint. The convex part may be referred to as a ridge. The ridge part contacts the outer part (e.g., the cover glass 620) of the display panel 420, and when contact is made, a change in capacitance may occur. The processor 410 of the electronic device 100 may check whether the object 440 is in contact. The concave part may be referred as a valley. A gap (e.g., air) may be formed between the valley part and the outer part of the display panel 420 (e.g., cover glass 620). When at least a portion of the light passes through the gap, is reflected by at least a portion of the valley, and is introduced into the electronic device 100, the reflectivity may be different from when the portion of light is reflected by the ridge part. The processor 410 of the electronic device 100 may distinguish the ridge from the valley based on the difference between the light reflecting off the ridge and the light reflecting off the valley. The processor 410 of the electronic device 100 may obtain information on a fingerprint corresponding to a finger based on the distinguishing between the ridge and the valley.

The ridge may be the first portion 441 and the valley may be the second portion 442. If the light from at least one light source 610 reflecting off the first portion 441 of the object 440 is obtained, the point detector 430 may detect the amount of reflected light of a first level. If the light emitted from at least one light source 610 reflecting off the second portion 442 of the object 440 is obtained, the point detector 430 may detect the amount of reflected light of a second level.

The amount of reflected light may vary depending on which part of the object 440 reflects the light emitted from the at least one light source 610. For example, if the object 440 is a fingerprint, the fingerprint may include a ridge that is the first portion 441 and a valley that is the second portion 442. The amount of reflected light detected by the point detector 430 may vary depending on whether the emitted light reflects off the ridge that is the first portion 441 or reflects off the valley that is the second portion 442. If the light emitted from at least one light source 610 reflects off at least a portion of the ridge that is the first portion 441 of the object 440, the refection may occur at the interface between the cover glass 620 and the object 440. If the light emitted from at least one light source 610 reflects off at least a portion of the valley that is the second portion 442 of the object 440, reflection may occur at the interface between the cover glass 620 and the air layer.

In an embodiment, the difference between the refractive index of the cover glass 620 and the refractive index of the object 440 may be smaller than the difference between the refractive index of the cover glass 620 and the refractive index of air. If reflection occurs at the interface between the cover glass 620 and the object 440, the difference in the refractive index at the interface may be reduced, and thus the reflectivity at the interface may be reduced. If the reflectivity at the interface between the cover glass 620 and the object 440 is reduced, the amount of light detected by the point detector 430 may be reduced. If reflection occurs at the interface between the cover glass 620 and the air layer, the difference in the refractive index at the interface may be increased, and thus the reflectivity at the interface may be increased. If the reflectivity at the interface between the cover glass 620 and the air layer is increased, the amount of light detected by the point detector 430 may be increased. The processor 410 may determine whether the surface of a specific region of the object 440 is a ridge or valley based on the amount of light detected by the point detector 430.

Figure 8A:
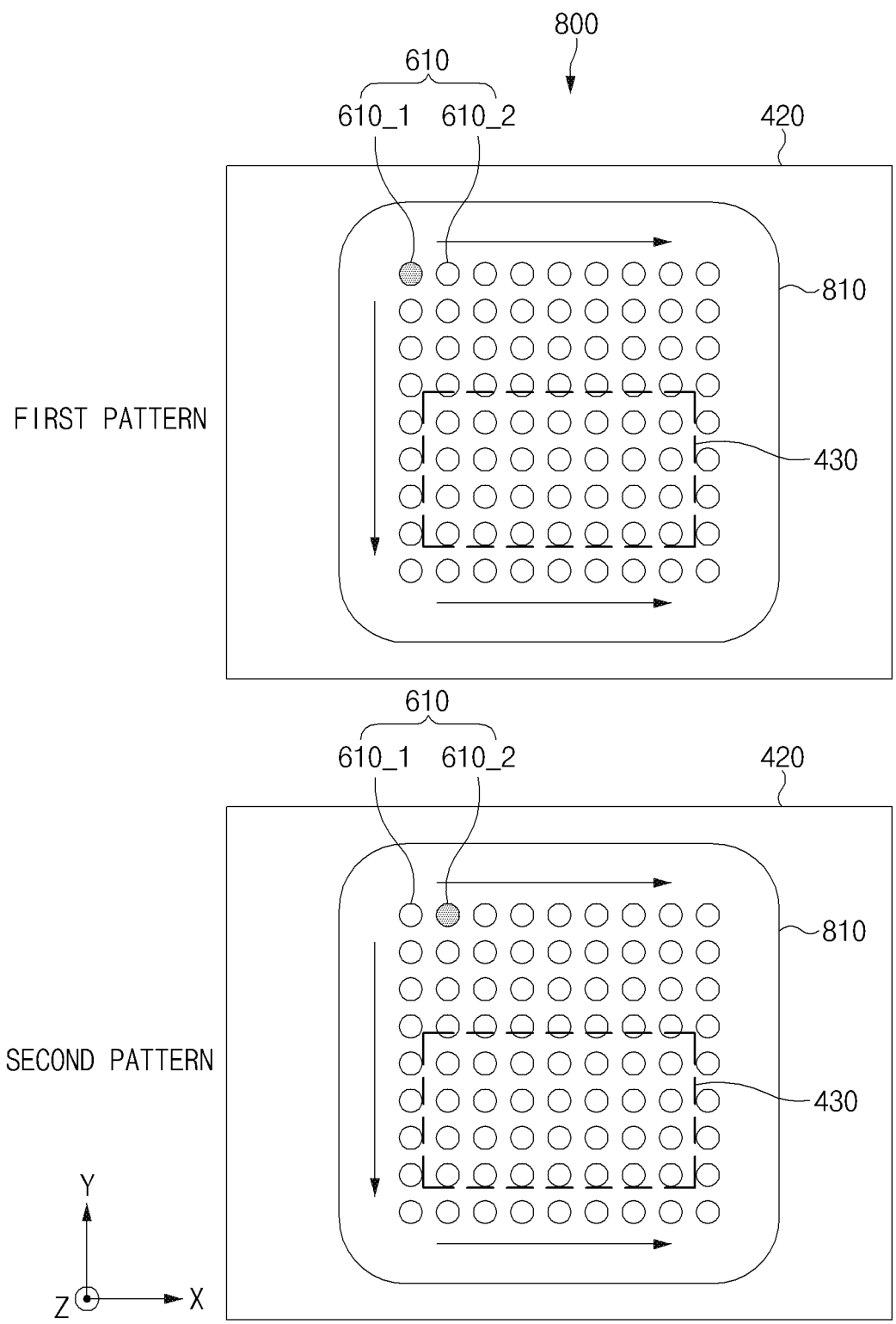
FIG. 8A is a diagram illustrating a light source activation pattern that sequentially changes in a state where any one light source of an electronic device is activated, according to an embodiment.

FIG. 8A is a diagram 800 illustrating a light source activation pattern that sequentially changes in a state where any one of the light sources 610 of an electronic device 100 is activated, according to an embodiment.

Referring to FIG. 8A, after the object 440 contacts the cover glass 620 on the display panel 420, any of the light sources 610 comprising light source 610_1 and light source 610_2 may display a light source activation pattern having a shape of a first pattern on the display panel 420 for a first period. The first pattern may be a pattern in which, among the light sources 610 disposed in the region 810 contacted by the object 440, any one of the outermost light sources 610 is activated. For example, the first pattern may be a pattern in which among the light sources 610 disposed in the region 810 where the object 440 contacts the display panel 420, a light source 610_1 disposed at the leftmost of the top row is activated.

After the first period elapses, any one of the light sources 610 may display a light source activation pattern having a shape of a second pattern on the display panel 420 for a second period. The second pattern may be a pattern in which the light sources 610 are a different pattern from the first pattern while activated. The second pattern may be a pattern in which the activated light sources 610 are disposed to be adjacent to the activated light sources 610 in the first pattern. For example, the second pattern may be a pattern in which, among the light sources 610 disposed in the region 810 where the object 440 contacts the display panel 420, a light source 610_2 disposed at the second position from the left in the top row is activated.

The light source activation pattern may be pattern in which any one pixel is activated. Activation operations may include an operation of applying power to at least one pixel (e.g., a turn-on function), an operation of changing the color of at least one pixel (e.g., from blue to green), an operation of changing the luminance value of at least one pixel, and an operation of changing the brightness of at least one pixel. The pixel may display the color of red, green, and/or blue.

The second period may be the same as or different from the first period depending on the sensitivity of the point detector 430 to the first pattern and the sensitivity of the point detector 430 to the second pattern. For example, if the sensitivity of the point detector 430 to the second pattern is excellent, the second period may be shorter than the first period. Alternatively, if the sensitivity of the point detector 430 to the second pattern is reduced more than the sensitivity of the point detector 430 to the first pattern, the second period may be longer than the first period.

The light source activation pattern may be a pattern in which any one pixel is activated. By activating one pixel at a time, it is possible to scan the entire measurement region while locally selecting the measurement site. In this case, it is possible to reduce the size of the region to be measured for one period, and it is possible to increase the resolution of the image related to biometric information. When the processor 410 uses, as the light source activation pattern, a pattern in which any one pixel is activated, a determination may be made as to whether or not the intensity of light reflecting off the object 440 satisfies a specified condition.

In order to determine whether or not the intensity of the light reflecting off the object 440 satisfies a specified condition, the processor 410 may compare the intensity of the reflected light with the electric and/or thermal noise of the point detector 430 itself and check whether or not the intensity of the reflected light detected by the point detector 430 is equal to or greater than a specified multiple of the noise.

Figure 8B:
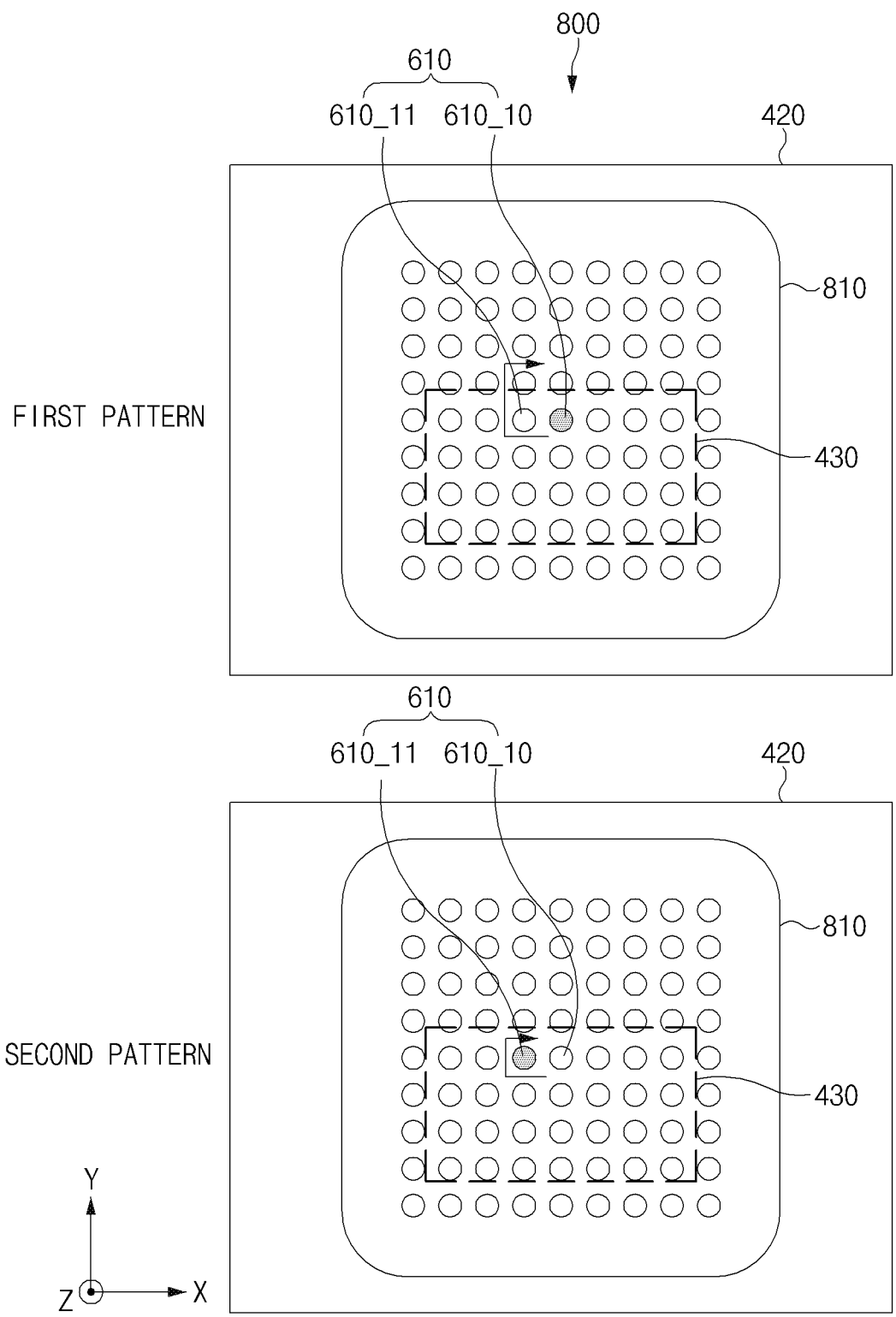
FIG. 8B is a diagram illustrating a light source activation pattern that sequentially changes in a state where any one light source of an electronic device is activated, according to an embodiment.

FIG. 8B is a diagram 820 illustrating a light source activation pattern that sequentially changes in a state where any one of the light sources 610 of an electronic device 100 is activated, according to an embodiment.

Referring to FIG. 8B, a first pattern may be a pattern in which any of the light sources 610 comprising light source 610_10 and light source 610_11 disposed in the center of the region 810 where the object 440 contacts the display panel 420 is activated. The first pattern may be activated from the central region and a second pattern may be extended to the outer region of the central region for recognizing the fingerprint. For example, the fingerprint may be recognized clockwise after starting recognition from the center and moving the recognition point to the left. In this case, while recognizing the fingerprint in a rotating spiral, the recognition region may be extended to the outer region.

The first pattern may be a pattern in which, among the plurality of light sources 610, the light source 610_10 disposed in the center is activated. The second pattern may be a pattern in which a light source 610_11 adjacent to the light source 610_10 disposed at the center of the plurality of light sources 610 is activated. For example, if the fingerprint is recognized while extending from the center to the outer region in a spiral, the second pattern may be a pattern in which the light source 610_11 disposed on the left side of the light source 610_10 disposed in the center is activated.

Figure 8C:
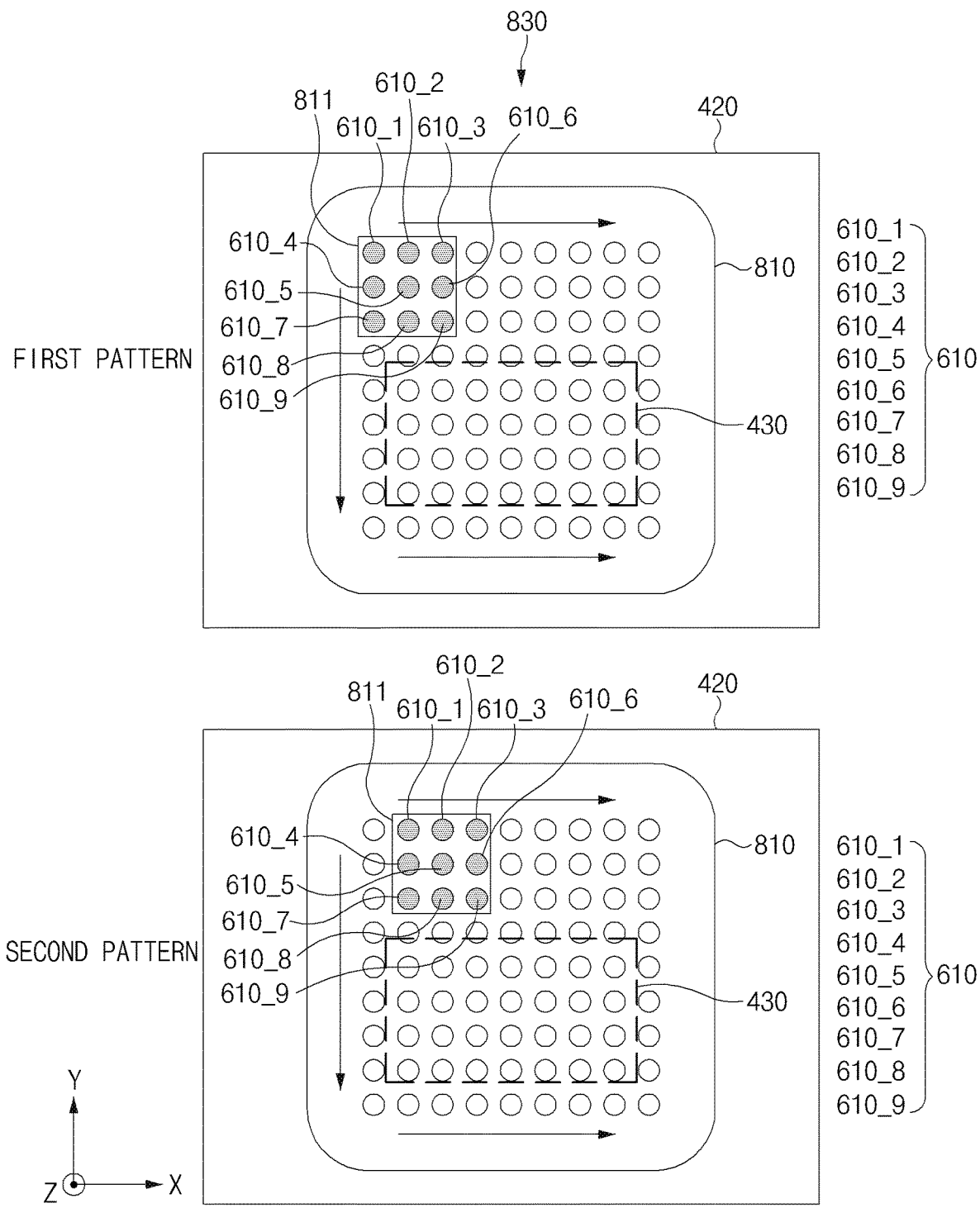
FIG. 8C is a diagram illustrating a light source activation pattern that sequentially changes in a state where a plurality of light sources of an electronic device are activated, according to an embodiment.

FIG. 8C is a diagram 830 illustrating a light source activation pattern that sequentially changes in a state where a plurality of light sources 610 of an electronic device 100 are activated, according to an embodiment.

Referring to FIG. 8C, after the object 440 contacts the display panel 420, the plurality of light sources 610 may display a light source activation pattern having a shape of a first pattern on the display panel 420 for the first period. The first pattern may be a pattern in which among the light sources 610 disposed in the region 810 where the object 440 contacts the display panel 420, a plurality of light sources 610 disposed at a first portion 811 are activated. For example, the first pattern may be a pattern in which among the light sources 610 disposed in the region where the object 440 contacts the display panel 420, the plurality of light sources 610 include nine light sources 610_1, 610_2, 610_3, 610_4, 610_5, 610_6, 610_7, 610_8, and 610_9 that may be activated and disposed on the upper left side. The plurality of light sources 610_1, 610_2, 610_3, 610_4, 610_5, 610_6, 610_7, 610_8, and 610_9 may also be variably selected from device settings of the electronic device 100 or selected by a determination of the processor 410. For example, if fingerprint sensing of the electronic device 100 has to be precise, the number of the plurality of light sources 610_1, 160_2, 610_3, 610_4, 610_5, 610_6, 610_7, 610_8, and 610_9 to be selected may be smaller. Additionally or alternatively, if fingerprint sensing has to be quickly performed, the fingerprint sensing may be performed by selecting a large number of light sources 610_1, 610_2, 610_3, 610_4, 610_5, 610_6, 610_7, 610_8, and 610_9.

After the first period elapses, any one light source 610 may display a light source activation pattern having a shape of a second pattern on the display panel 420 for the second period. The second pattern may be a pattern in which the light sources 610 that are activated are at least partially different from those in the first pattern. The second pattern may be a pattern in which the light sources that are activated are disposed in a portion adjacent to the portion activated in the first pattern. For example, the second pattern may be a pattern in which, among the light sources 610 disposed in the region where the object 440 contacts the display panel 420, the three leftmost light sources on the upper left side are turned off in comparison with the first pattern, and among the light sources which have been turned off in the first pattern, three light sources 610 disposed to be adjacent to the light sources 610 activated in the first pattern on the right side, are additionally activated.

At least one light source 610_2, 610_3, 610_5, 610_6, 610_8, and 610_9 included in the first pattern may be a light source that is at least partially overlapped with at least one light source 610_1, 610_2, 610_4, 610_5, 610_7, and 610_8 included in the second pattern.

By simultaneously activating the plurality of light sources 610, it is possible to increase the amount of light reflected by one light source activation pattern. According to the Nyquist sampling theorem, when the resolution of the image required by the point detector 430 is about 300 micrometers (μm) and the size of one light source 610 is about 50 m, a light source activation pattern having a size of about 150 μm may be formed by simultaneously activating three light sources 610 both horizontally and vertically. This is because, according to the Nyquist sampling theorem, the size of the unit pattern sampled and/or recognized by the light source activation pattern has to be at least greater than half the unit size of the resolution to sample the information.

When sequentially scanning the light source activation pattern every specified first period, the scanning may be performed using one light source 610 as a unit, like the first pattern and the second pattern of FIG. 8B. However, the present disclosure is not limited thereto; when the resolution required by the point detector 430 increases, the scanning may be performed using the plurality of light sources 610_1, 610_2, 610_3, 610_4, 610_5, 610_6, 610_7, 610_8, and 610_9 as a unit. For example, compared to the light sources 610_1, 610_2, and 610_3 activated in the first pattern, the scanning of the light sources activated in the second pattern may be performed with three light sources activated from a point further apart by about the distance of three light sources 610_1, 610_2, and 610_3 in the X-axis direction (since the size of one light source is 50 μm, for three light sources, the points are 150 μm apart).

The processor 410 may variably control the period in which the light source activation pattern for measuring biometric information changes and/or the speed at which the shape of the light source activation pattern moves, depending on the resolution required by the point detector 430. An image sensor (e.g., a 2D array detector) has a fixed resolution and/or fixed speed of biometric information, and thus it is likely that the measuring of biometric information fails when a finer resolution is required in a specific situation. On the other hand, the point detector 430 may rapidly scan at a low resolution in the early stage of measuring biometric information. The electronic device may quickly complete the scanning operation and the biometric information sensing if the biometric information image generated based on the measurement data obtained by the point detector 430 satisfies a specified resolution condition to be used in the matching operation for comparison with the registered image by the processor 410. The electronic device may complete the biometric information sensing and the scanning operation if the biometric information generated based on the measurement data obtained by the point detector 430 is obtained to be used in a biometric authentication operation for comparison with previously registered biometric information. The electronic device may variably perform the scanning depending on whether precision is required or not. For example, if a high-resolution biometric information image is required for the matching operation by the processor 410, the processor 410 may be configured such that the point detector 430 performs a fine scan. The processor 410 may perform a matching operation after obtaining a high-resolution biometric information image.

Figure 8D:
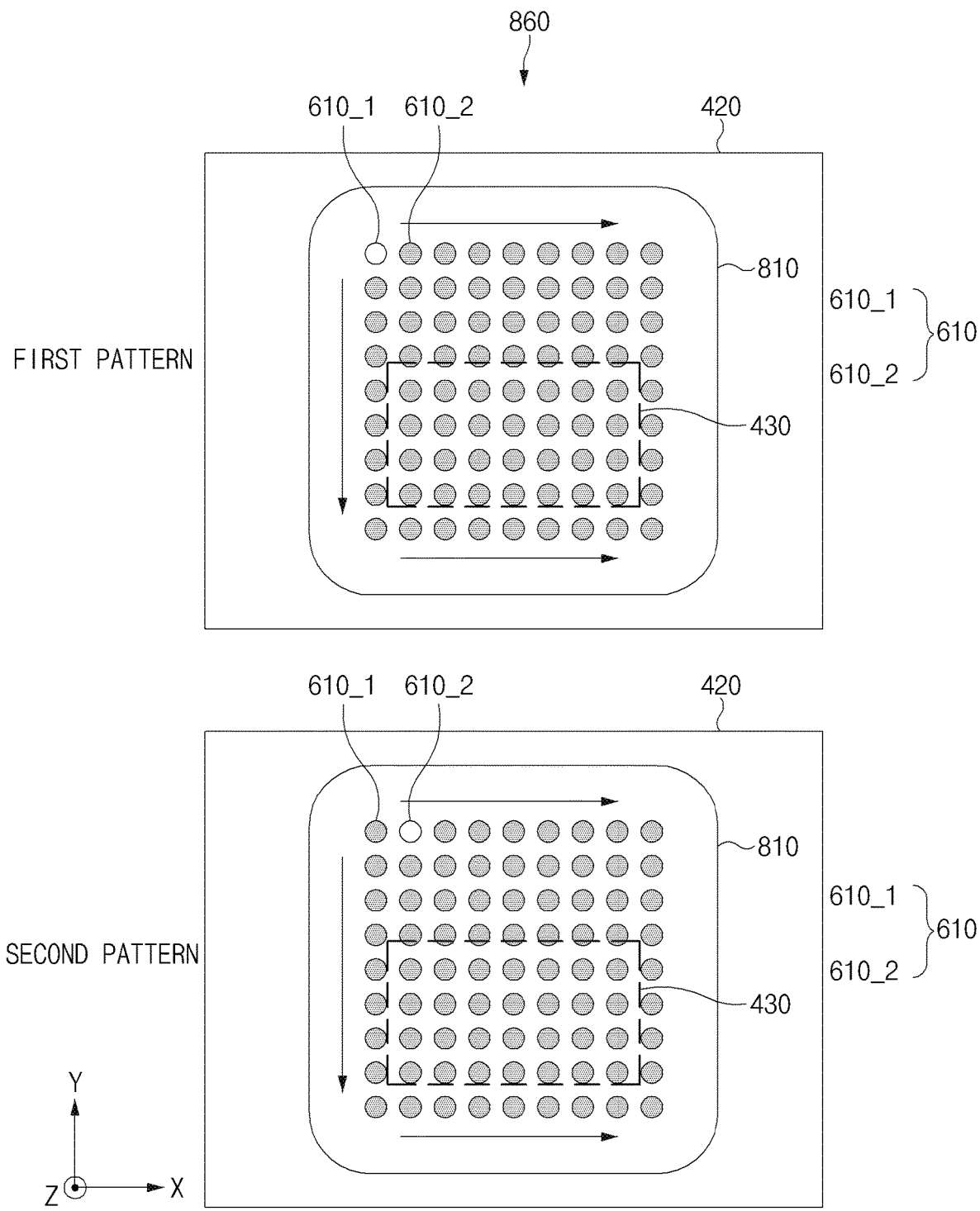
FIG. 8D is a diagram illustrating a light source activation pattern that sequentially changes in a state where any one light source of an electronic device is deactivated, according to an embodiment.

FIG. 8D is a diagram 860 illustrating a light source activation pattern that sequentially changes in a state where any one light source 610 of an electronic device 100 is deactivated (e.g., turned off), according to an embodiment.

Referring to FIG. 8D, after the object 440 contacts the display panel 420, any one of the light sources 610 may display a light source activation pattern having a shape of a first pattern on the display panel 420 for the first period. The first pattern may be a pattern in which, among the light sources 610 disposed in the region 810 where the object 440 contacts the display panel 420, any one of the light sources 610 disposed in some region (e.g., the outermost) is turned off. For example, the first pattern may be a pattern in which, among the light sources 610 disposed in the region 810 where the object 440 contacts the display panel 420, the light source 610-1 disposed at the leftmost of the top row is turned off.

After the first period elapses, any one of the light sources 610 may display a light source activation pattern having a shape of a second pattern on the display panel 420 for the second period. The second pattern may be a pattern in which the light sources 610 are different from the light sources that activated in the first pattern. The second pattern may be a pattern in which a light source that is disposed to be adjacent to the light source activated in the first pattern is turned off. For example, the second pattern may be a pattern in which, among the light sources 610 disposed in the region where the object 440 contacts the display panel 420, the light source 610-2 disposed at the second position from the left in the top row is turned off.

The light source activation pattern may be implemented in various forms by using the light sources 610 in the region contacted by the object 440 on the display panel 420. For example, as illustrated in FIG. 8C, a reversed-phase light source activation pattern may be used in which the light sources at a specific position are deactivated and the remaining light sources are activated. However, the present disclosure is not limited thereto; light source activation patterns, at least a portion of which has different shapes, may be sequentially output using the light sources 610 to perform scanning of the object 440.

Figure 9:
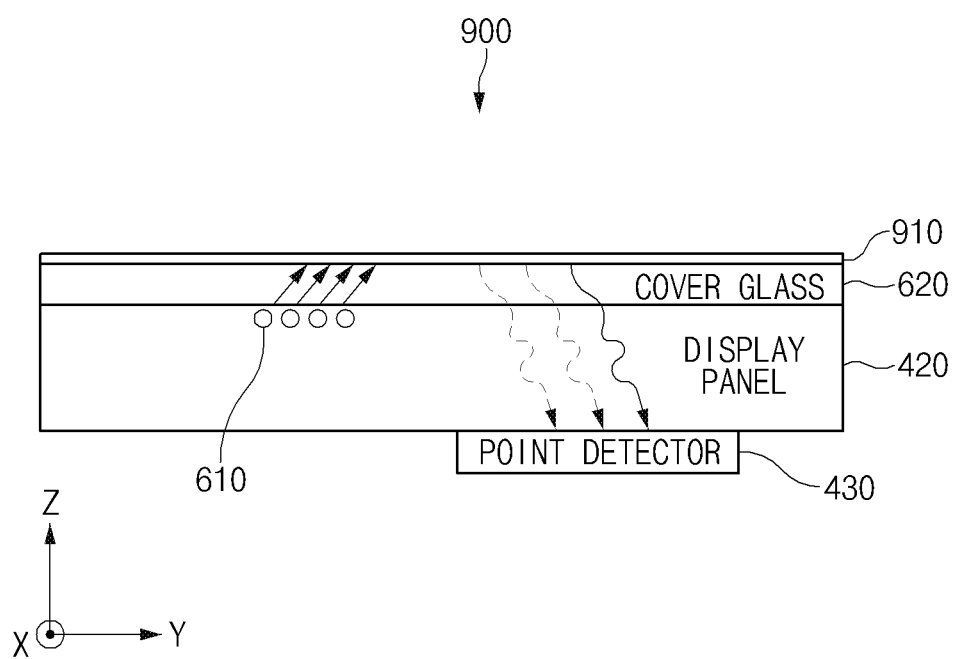
FIG. 9 is a diagram illustrating a method of correcting data measured by a point detector of an electronic device, according to an embodiment.

FIG. 9 is a diagram 900 illustrating a method of correcting data measured by the point detector 430 of an electronic device 100, according to an embodiment. After the display panel 420 and the cover glass 620 of the electronic device 100 are manufactured, the deviation of reflected light measured by the point detector 430 may be corrected in a calibration process.

Referring to FIG. 9, the position of at least one light source 610 may be different from the position of the point detector 430. In addition, the form in which the light emitted from at least one light source 610 is scattered while passing through the cover glass 620 and the display panel 420 after being reflected may also be different. Accordingly, even if reflectivity at the interface with an external object is the same, the amount of reflected light detected by the point detector 430 may be different from each other depending on the position of at least one light source 610. In order to correct the deviation of the amount of reflected light depending on the position of the at least one light source 610, the calibration process may be performed after the display panel 420 and the cover glass 620 are manufactured.

In order to perform the calibration process, a reflective layer 910 having a uniform reflectivity may be disposed on the surface of the cover glass 620. The reflective layer 910 may be a white sheet or a mirror. In the calibration process, at least one light source 610 may be activated in a state in which the reflective layer 910 is disposed.

The electronic device 100 may further include a memory (e.g., the register 460 of FIG. 4) storing compensation data (background data) for compensating for the scattering of light depending on the position in which at least one light source of the display panel 420 is activated. A processor 410 may be configured to compensate for deviation of light depending on the position of the display panel 420 using compensation data. The point detector 430 may measure the amount of the light reflected by the reflective layer 910 and detected by the point detector 430 whenever each of the at least one light source 610 is activated. In each case, the register 460 may store the magnitude of the detected light as the compensation data. When measuring the object 440, the processor 410 may correct the reflectivity of the object 440 using the compensation data stored in the memory 460. For example, the processor 410 may correct the deviation of the reflected light depending on the position of at least one light source 610 using the compensation data when calculating the ratio of the magnitude of the detected light compared to the magnitude of the light emitted from the at least one light source 610.

FIG. 1A is a diagram 1000 illustrating light emitted from the light source 610 of an electronic device 100 and reflected by the object 440, according to an embodiment. FIG. 10B is a diagram 1050 illustrating light emitted from the light source 610 of the electronic device 100, dispersed in the cover glass 620, and then reflected by the object 440, according to an embodiment.

Figure 10A:
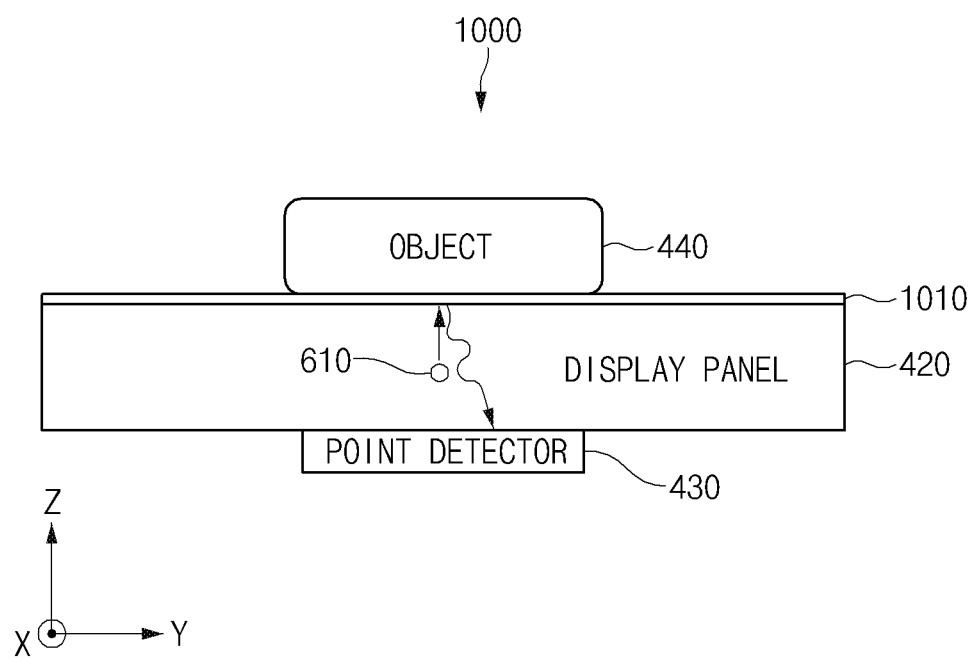
FIG. 10A is a diagram illustrating light emitted from a light source of an electronic device and reflected by an object, according to an embodiment.
Figure 10B:
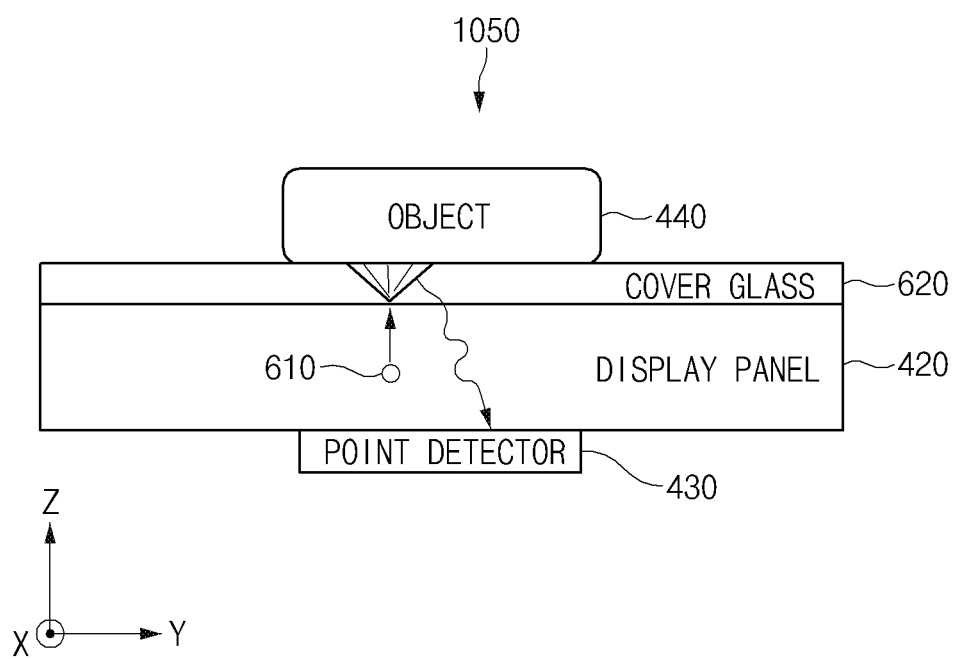
FIG. 10B is a diagram illustrating light emitted from a light source of an electronic device, dispersed in a cover glass, and then reflected by an object, according to an embodiment.

Referring to FIGS. 10A-10B, the position where the at least one light source 610 emits light may be different from the position where the object 440 contacts the display panel 420 including the thin glass cover 1010. For example, if the at least one light source 610 is a pixel, the position where light is emitted may be spaced apart from the position where the object 440 contacts the display panel 420 in the −Z-axis direction. As the position where the light is emitted is spaced further apart from the object 440 in the −Z-axis direction, the area of the light emitted from the light source 610 may be larger than the physical size of the light source 610. This may be defined as a source dispersion effect.

If the position of the light source 610 is located to be adjacent to the interface between the display panel 420 and the object 440, as in a case of FIG. 10A where a thin glass cover 1010 is disposed on the display panel 420, the size of a surface illumination image generated by the light emitted from the light source 610 displayed on the surface of the display may be substantially the same as the size of the actual light source 610. In this case, if the surface illumination image in which the emitted light is displayed on the display surface has the same area as that of the light source, the electronic device 100 may measure the object 440 in the form of point illumination. In a case where the light-emitting area is in the form of point illumination, it is possible to more precisely measure the object 440. For example, if the object 440 is the finger of the user, it is possible to obtain an increased resolution of a fingerprint image, which is biometric information to be obtained.

If the light emitted from the light source 610 passes through the cover glass 620, as illustrated in FIG. 10B, the emitted light may spread while traveling to the object 440. In this case, the emitted light may measure the object 440 in the form of surface illumination. The surface illumination image displayed on the display surface may be larger than the size of the light source. For example, the light emitted from the light source 610 may be emitted from the display surface in the form of surface illumination. At this time, light emitted in the form of surface illumination may be reflected by at least a portion of the object 440. Using the light reflecting off the object 440, the electronic device 100 may obtain information about the object 440. In the case of the surface illumination form, the resolution of the biometric information obtained by measuring the object 440 with low precision may be reduced.

Figure 11:
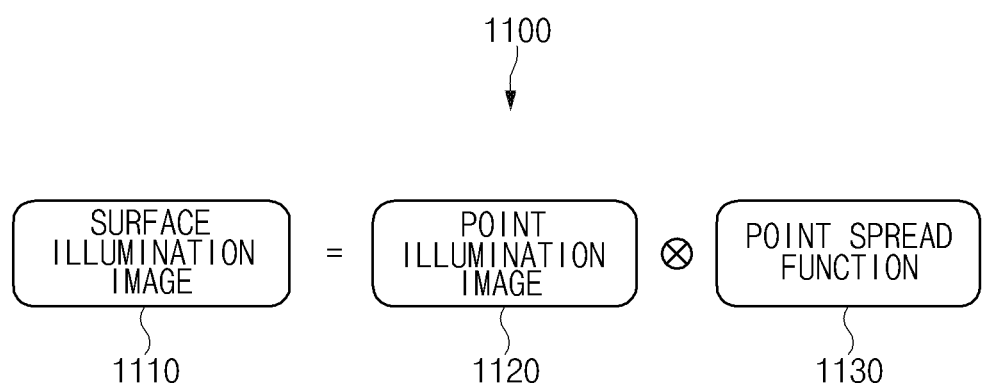
FIG. 11 is a diagram illustrating a process in which an electronic device obtains an image related to biometric information, according to an embodiment.

FIG. 11 is a diagram 1100 illustrating a process in which an electronic device 100 obtains an image related to biometric information, according to an embodiment.

Referring to FIG. 11, a surface illumination image 1110 may be obtained by a phenomenon in which the emitted light spreads while a point illumination image 1120 reaches an object 440 for measuring biometric information. The surface illumination image 1110 may have a form in which a point spread function (PSF) 1130 is applied to the point illumination image 1120. The PSF 1130 may be obtained by operating a light source 610 without the object 440 on the surface of a display panel 420 and measuring the emitted state. If the surface illumination image 1110 is an image related to biometric information, the surface illumination image 1110 may have a form of a convolution integral of the PSF 1130 applied to the point illumination image 1120.

A memory (e.g., the register 460 of FIG. 4) may store compensation data, which is a value obtained by measuring the PSF 1130 in advance. If the emitted light spreads and the surface illumination image 1110 is obtained by the light reaching the object 440 in the form of the surface illumination, a processor 410 may correct the surface illumination image 1110 through the process of deconvolution of the PSF 1130 on the surface illumination image 1110 using the compensation data.

If the user of the electronic device 100 attaches a protective film or a protective glass to the surface of the display panel 420 and the distance from the light source 610 to the object 440 to be measured changes, the surface illumination image 1110 may be corrected through the correction method described above. For example, if the surface illumination image 1110 is propagated as much as the thickness of the protective film or the protective glass based on information on the angle at which light emitted from the light source 610 is dispersed, the PSF 1130 may be obtained when the protective film or the protective glass is used. If the protective film or the protective glass is used, it is highly likely that light emitted from the light source 610 is scattered by the protective film or the protective glass and takes the form of surface illumination. The processor 410 of the electronic device 100 may correct the surface illumination image 1110 through the process of deconvolution of the PSF 1130 on the surface illumination image 1110 using the compensation data.

Figure 12:
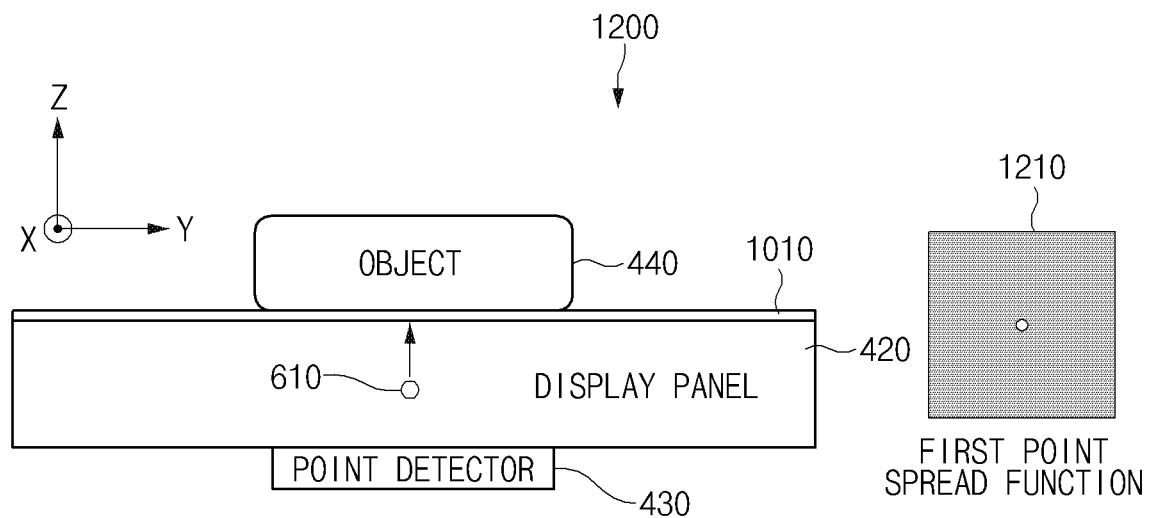
FIG. 12 is a diagram illustrating a process in which an electronic device obtains and corrects an image from an object by using a first point spread function to obtain a corrected image, according to an embodiment.
Figure 12:
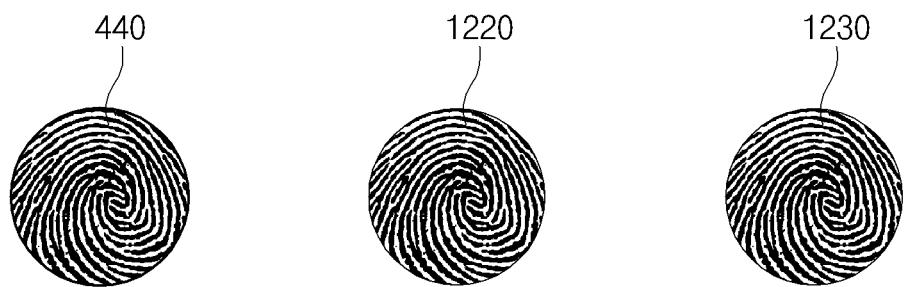

FIG. 12 is a diagram 1200 illustrating a process in which an electronic device 100 obtains and corrects an image 1220 from the object 440 using a first PSF 1210 to obtain a corrected image 1230, according to an embodiment.

Referring to FIG. 12, biometric information 1220 of the object 440 may be obtained using light emitted from the light source 610. For example, if the object 440 is the finger of the user, the biometric information 1220 may be a fingerprint. The corrected image 1230 may be obtained by deconvolution of the first PSF 1210 on the obtained biometric information 1220.

If the dispersion of light emitted from the light source 610 does not occur, the image 1220 related to the obtained biometric information may be substantially the same as the object 440. For example, if light emitted with a precision of about 50 μm reaches the object 440, the object 440 may be measured in the form of the point illumination. In this case, the corrected image 1230 obtained by applying deconvolution may be substantially the same as the obtained image 1220.

Figure 13:
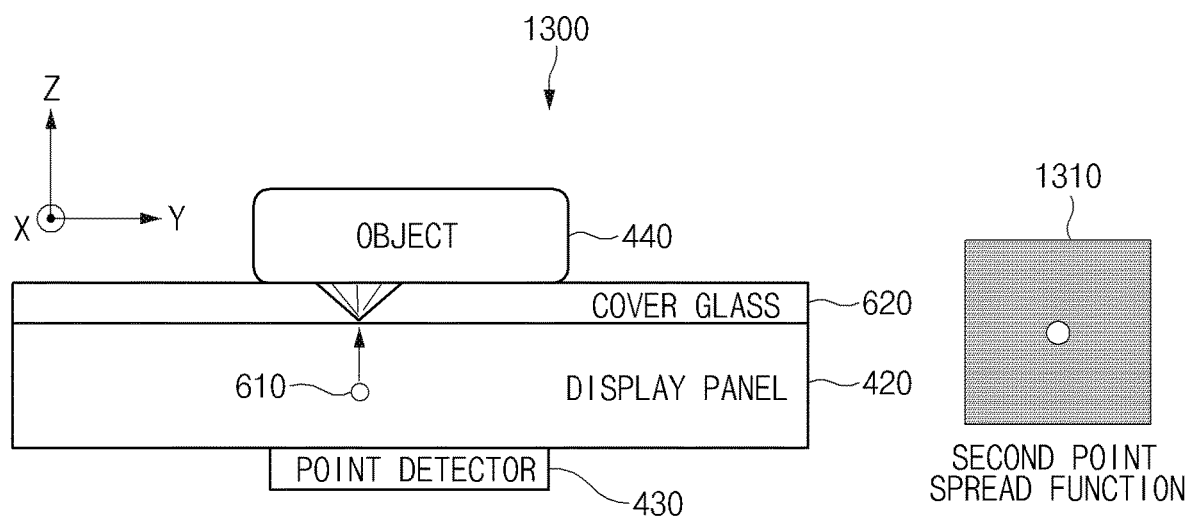
FIG. 13 is a diagram illustrating a process in which an electronic device obtains and corrects an image from an object using a second point spread function to obtain a corrected image, according to an embodiment.
Figure 13:
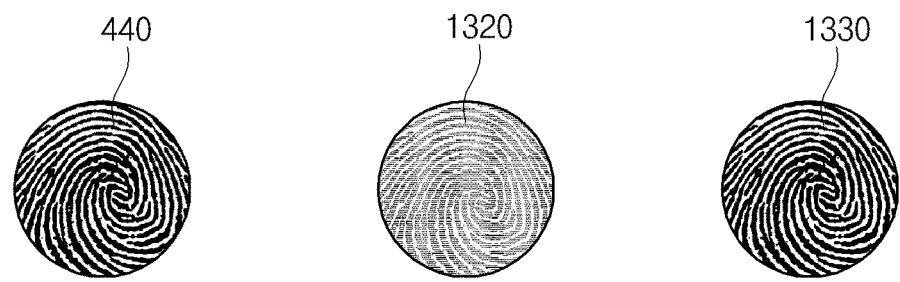

FIG. 13 is a diagram 1300 illustrating a process in which an electronic device 100 obtains and corrects an image 1320 from the object 440 using a second PSF 1310 to obtain a corrected image 1330, according to an embodiment.

Referring to FIG. 13, if dispersion occurs while the light emitted from the light source 610 travels toward the object 440, the image 1320 related to the obtained biometric information may have a low resolution as compared to the object 440. For example, if the emitted light has a precision of about 150 μm when it reaches the object 440, the object 440 may be subjected to low pass filtering by applying the second PSF 1310 to the object 440, thereby obtaining the image 1320 substantially in the same form as a blurry image. In this case, the corrected image 1330 may be obtained by deconvolution of the second PSF 1310 stored as compensation data on the obtained image 1320.

Figure 14:
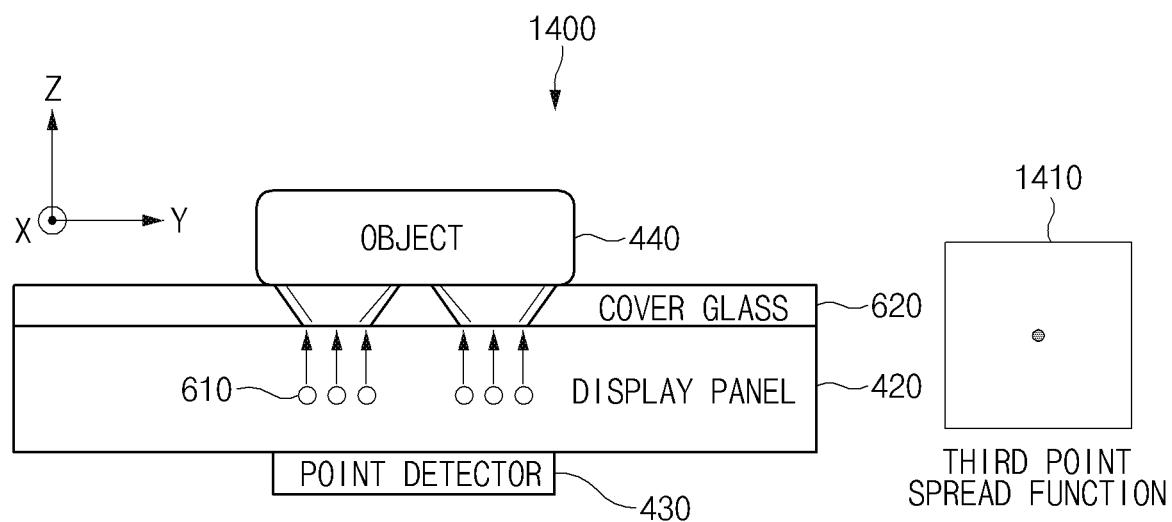
FIG. 14 is a diagram illustrating a process in which an electronic device obtains and corrects an image from an object using a third point spread function to obtain a corrected image, according to an embodiment.
Figure 14:
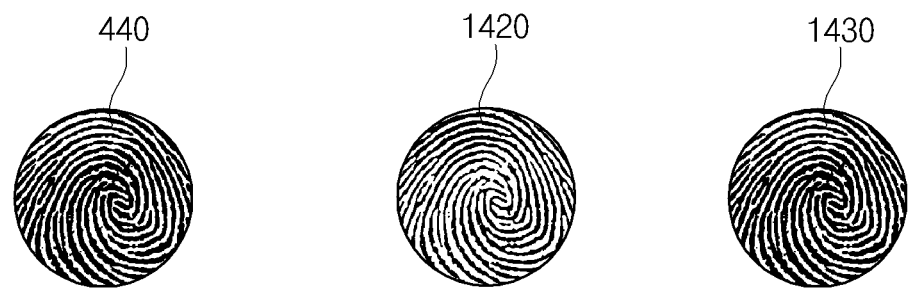

FIG. 14 is a diagram 1400 illustrating a process in which an electronic device 100 obtains and corrects an image 1420 from the object 440 using a third PSF 1410 to obtain a corrected image 1430, according to an embodiment.

Referring to FIG. 14, if the light emitted from the light source 610 is excessively dispersed before reaching the object 440, a hole illumination method may be used. The hole illumination method may be a method of emitting light to the object 440 by deactivating only the light sources of a region corresponding to a size of a specified precision among the light sources 610 and activating all of the light sources of the remaining regions. For example, when the precision is about 50 μm, only the light sources 610 of the corresponding portion may be left in a black state and the light sources of the remaining regions may be activated. As described above, the image 1420 may be obtained by measuring the object 440 using a negative scanning method. The obtained image 1420 may have an inverted and/or reversed form as compared to the object 440. Since in the image 1420 obtained by the negative scanning method, light is emitted from the light sources 610 disposed in the entire remaining region, the influence of dispersion may be canceled out, and thus a specified resolution may be satisfied. If the obtained image 1420 is inverted and/or reversed again using an image processing process and then deconvolution is performed with the PSF 1410, the corrected image 1430 may be obtained.

Figure 15:
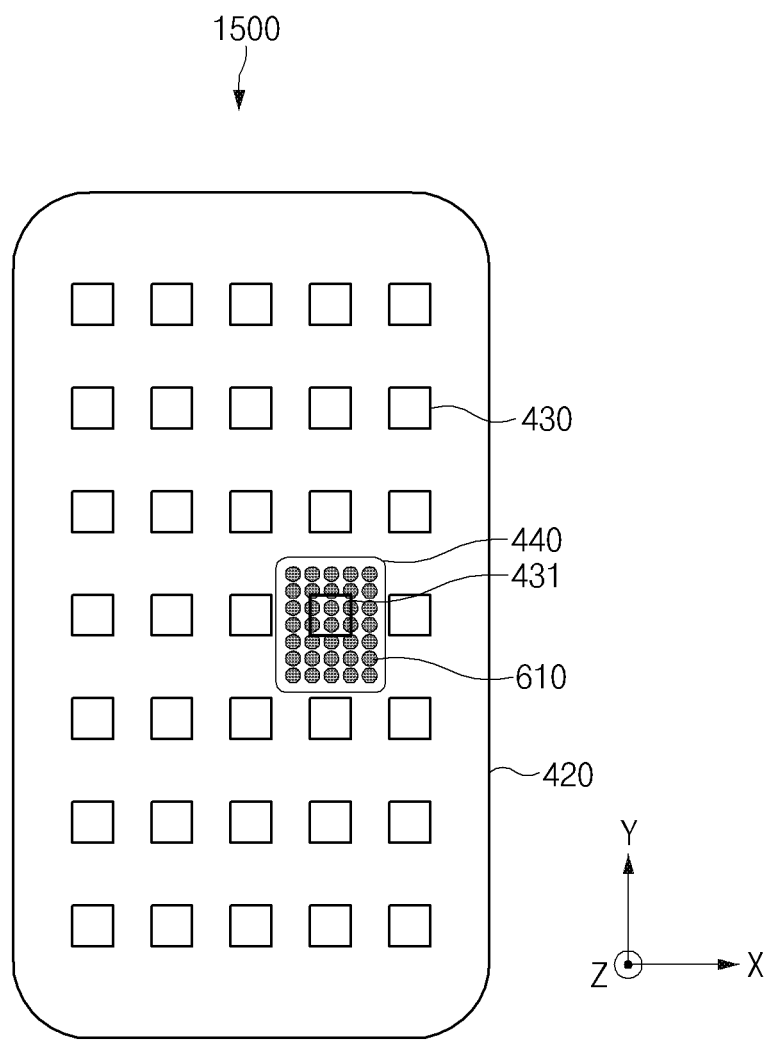
FIG. 15 is a diagram illustrating a plurality of point detectors disposed on one surface of a display panel, according to an embodiment.

FIG. 15 is a diagram illustrating a plurality of point detectors 430 disposed on one surface of the display panel 420, according to an embodiment.

Referring to FIG. 15, a full display sensing structure may be implemented in which the point detectors 430 are disposed on one entire surface of the display panel 420. The point detectors 430 may be disposed on the display panel 420 at a specified interval. For example, if the point detectors 430 detecting the fingerprint of the user are disposed on the entire surface of the display panel 420, the fingerprint of the user may be obtained even if the finger of the user touches any part of the entire region of the display panel 420.

Each of the point detectors 430 may have a size of a specified range. The specified range of the point detector 430 may include at least a range that is determined to measure light reflecting off the finger of the user and to prevent noise from being generated by external light.

The size of each of the point detectors 430 may be smaller than a general finger, and thus may have a size capable of completely shielding external light when the finger of the user touches it. Each of the point detectors 430 may have a size capable of detecting light emitted from the light source 610 and reflected by the object 440. For example, each of the point detectors 430 may have a size of a square shape having a length and a width of about 0.9 mm or more and about 1 mm or less. If the size of the point detector 430 is smaller than a specified range, sensitivity to detecting reflected light may be lowered. If the size of the point detector 430 is larger than the specified range, the point detector 430 may protrude at least partially out of the object 440, which may cause the point detector 430 to be affected by external light. Accordingly, each of the point detectors 430 may have a size of the specified range.

The point detector 430 may be attached to the back surface of the display panel 420 or may be inserted into the display panel 420. The touch sensor and the light source 610 may be disposed on the entire surface of the display panel 420. Accordingly, if the point detector 430 is disposed on the entire surface of the display panel 420, biometric information may be obtained from the object 440 even if the object 440 is touched anywhere on the entire surface of the display panel 420. For example, if the object 440 is the finger of the user and the point detector 430 obtains the fingerprint of the user, when the position of the finger is detected by the touch sensor disposed on the display panel 420, the processor 410 may activate a point detector 431 corresponding to the detected position. The processor 410 may cause the light source 610, which is at the portion corresponding to the point detector 431 corresponding to the detected position, to emit light in an illumination pattern that changes sequentially at a specified period. The point detector 431 corresponding to the detected position may obtain the fingerprint image by detecting light reflecting off the object 440.

Figure 16:
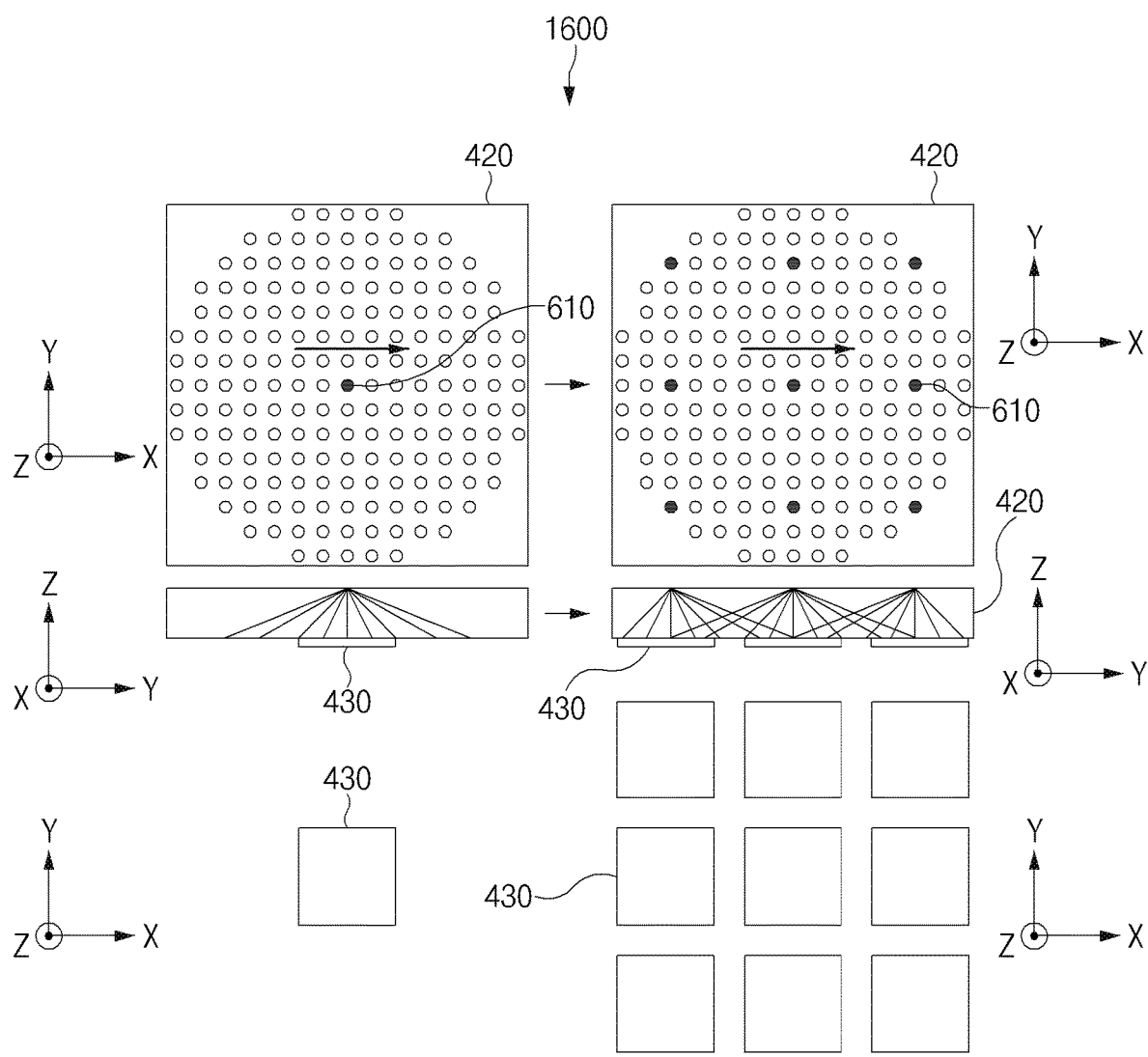
FIG. 16 is a diagram illustrating a method of scanning biometric information using a plurality of point detectors, by an electronic device, according to an embodiment.

FIG. 16 is a diagram illustrating a method of scanning biometric information using a plurality of point detectors 430, by an electronic device 100, according to an embodiment.

Referring to FIG. 16, the time taken to measure the biometric information may be set by the scanning speed of the light source activation pattern. If the light source 610 is implemented as a pixel disposed on the display panel 420, the minimum scanning size may be about 50 μm when the resolution of the display panel 420 is about 550 pixels per inch (ppi). In the display panel 420, a refresh rate may be determined by an operation of a display driver IC (DDI). For example, if a general screen is displayed, the DDI may have a refresh rate of 30 hertz (Hz), 60 Hz, and/or 120 Hz.

The DDI may control the operating frequency of the DDI in order to quickly measure biometric information. If the biometric information is the fingerprint of the user, the refresh rate may be increased in a region for measuring the fingerprint of the user, and the refresh rate in the remaining regions may be reduced. For example, since the response speed of the pixel is about 0.1 ms, the refresh rate may be increased up to about 10,000 Hz. Accordingly, the refresh rate may be increased to about 10,000 Hz in the fingerprint measurement region, and the refresh rate may be reduced to about 1 Hz in the regions other than the fingerprint measurement region, as in the always on display (AOD) or the reading mode. In another example, the DDI may have a high-speed mode with a refresh rate of about 240 Hz. The DDI may temporarily increase the refresh rate when the fingerprint is measured. When the refresh rate is increased, power consumption of the display panel 420 may be temporarily increased. However, if the refresh rate is increased, the display panel 420 may display a dynamic screen such as a video and/or game more naturally while measuring biometric information.

If the light source activation pattern moves in the same form, the DDI may perform row scanning first and then column scanning. In this case, the same data as row scanning may be used for column scanning, thereby reducing the time required for data loading.

If the light sources 610 used in the light source activation pattern are pixels, the DDI may be configured such that the pixels have the same color. For example, if the color of the light source activation pattern used is red, green, or blue pixels, when measuring biometric information, only the light source 610 of the corresponding color may be refreshed, thereby increasing the measurement speed of the biometric information.

A processor 410 may be configured to reduce the number of times an object 440 is scanned in order to increase the speed of obtaining biometric information. The processor 410 may increase the number of point detectors 430 operating simultaneously in order to reduce the number of times the object 440 is scanned. For example, the processor 410 may store, in advance, an effect on each point detector 430 by the emission from one light source 610 and the reflection from the object 440. In this case, the plurality of point detectors 430 may be simultaneously used to scan the object 440.

Each of the point detectors 430 may be disposed to be spaced apart at specified intervals. Each of the point detectors 430 may obtain reflected light, which reflects off the object 440 and passes through the display panel 420. Each of the point detectors 430 may be disposed to be spaced apart by a distance at which the light reflecting off the region adjacent to the object 440 is low by a specific ratio compared to the light reflecting off the region overlapped with the object 440 in the Z-axis direction. If each of the point detectors 430 is disposed to be spaced apart such that the light reflecting off the region adjacent to the object 440 is obtained by about 10% or less compared to the light reflecting off the region overlapped with the object 440 in the Z-axis direction, the number of times the object 440 is scanned may be reduced by performing parallel imaging while reducing the effect of crosstalk noise between adjacent point detectors 430. In this case, when the point detectors 430 operates simultaneously, the size of each point detector 430e may be reduced than when one point detection sensor 430 operates.

Figure 17:
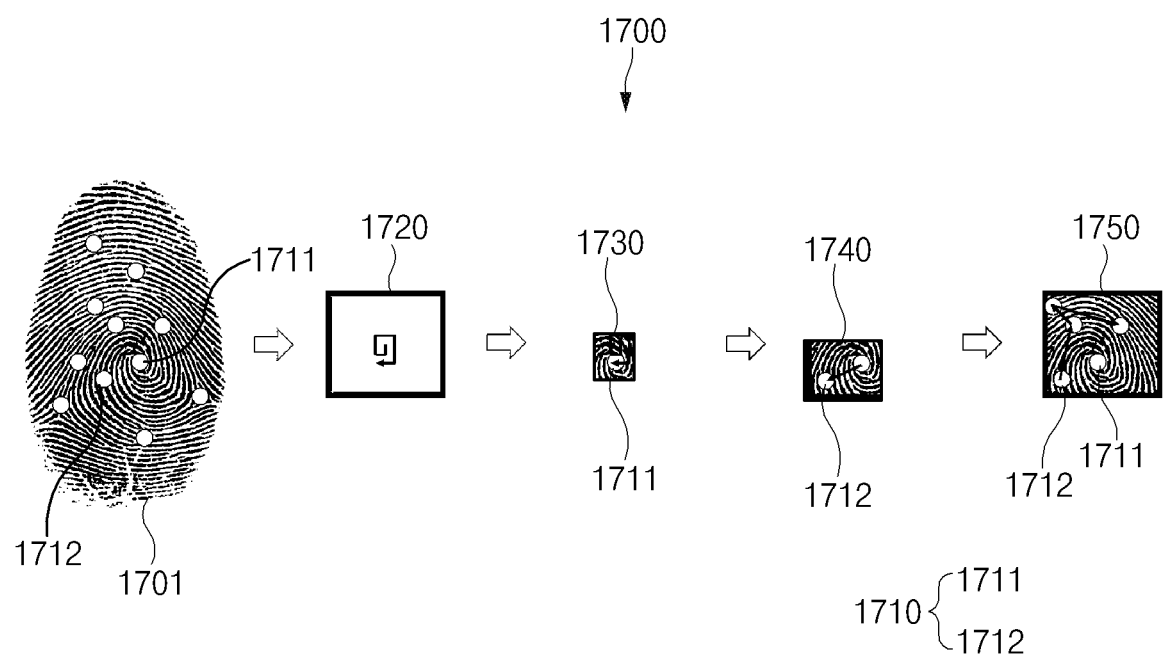
FIG. 17 is a diagram illustrating a method of scanning biometric information using feature points of a registered image related to the biometric information, by an electronic device, according to an embodiment.

FIG. 17 is a diagram 1700 illustrating a method of scanning biometric information using feature points 1710 of a registered image 1701 related to the biometric information, by an electronic device 100, according to an embodiment.

Referring to FIG. 17, the electronic device 100 may further include a memory (e.g., the register 460 of FIG. 4) storing the registered image 1701 of the biometric information and the feature points 1710 of the registered image. For example, when the fingerprint of the user is obtained using a point detector 430, the registered image 1701 may be a previously obtained fingerprint. The feature points 1710 may be a portion for obtaining a feature to be used by a processor 410 from the obtained biometric information, in a fingerprint matching process.

The processor 410 may be configured such that among at least one of the light sources 610, the light sources 610 disposed in regions adjacent to the feature points 1710 emits light. The point detector 430 may obtain features to be used by the processor 410 in the fingerprint matching process without having to obtain the entire fingerprint image and provide it to a consumer. The processor 410 may transmit the feature of the fingerprint to the processor 410 by scanning only the portions where the feature points 1710 exist, without having to scan the entire object 440 such as the finger of the user in a fingerprint authentication process.

The processor 410 may start scanning at a central portion 1720 of a field of view (FOV). In the central portion 1720, reflected light such as a fingerprint signal may be transmitted most strongly, and the touch of the object 440 such as the finger may be secured most reliably. For example, the processor 410 may perform scanning to rotate in a spiral form while gradually moving away from the central portion 1720. Additionally or alternatively, the processor 410 may find the feature points 1710 through a random search.

The processor 410 may obtain a first screen 1730 in which a first feature point 1711 is detected through scanning. The processor 1730 may obtain the first feature point 1711 from the first screen 1730 and obtain position information of the first feature point 1711 from fingerprint information that has already been registered.

The processor 410 may select a position where a second feature point 1712 that is closest to the position of the detected first feature point 1711 is expected to be present. The processor 410 may perform scanning around the position where the second feature point 1712 is expected to be present. In order to match the orientation of the finger during the authentication process with the orientation of the fingerprint in the registration process, the processor 410 may select the position of the second feature point 1712 in consideration of the registered orientation of the first feature point 1711 and the detected orientation of the first feature point 1711.

The processor 410 may obtain a second screen 1740 for identifying the second feature point 1712 at a position where a feature point is expected to be present. In this manner, the processor 410 may find all the feature points 1710 in the entire viewing angle region to obtain a feature point image 1750. The processor 410 may selectively perform scanning around the feature points 1710 required in the fingerprint matching process, thereby reducing the scanning time as compared to scanning the entire fingerprint region.

Figure 18:
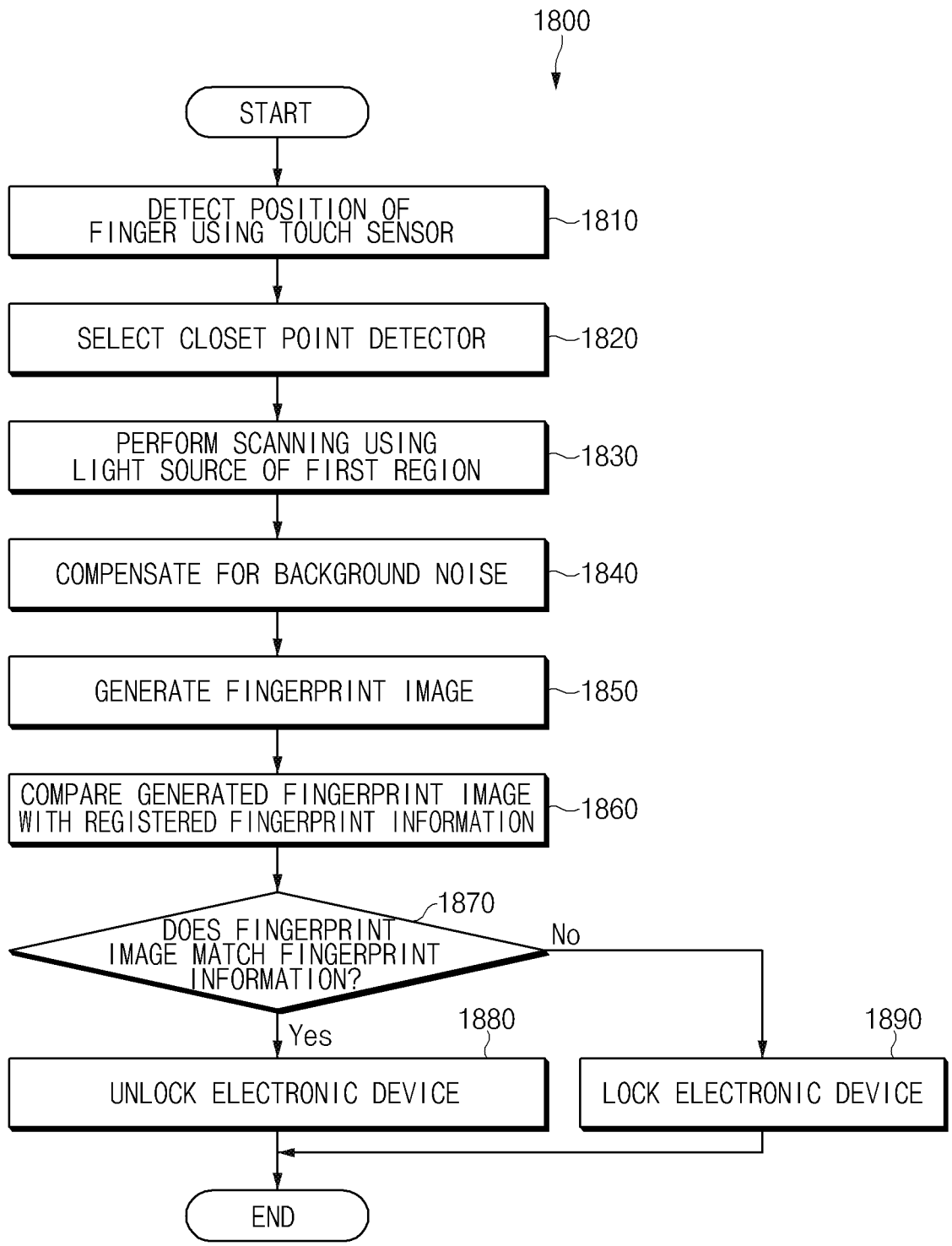
FIG. 18 is a flowchart illustrating a process in which an electronic device obtains a fingerprint of a user and determines whether to unlock an electronic device, according to an embodiment.

FIG. 18 is a flowchart 1800 illustrating a process in which the electronic device 100 obtains a fingerprint of a user and determines whether to unlock an electronic device 100, according to an embodiment.

In step 1810, a processor 410 detects the position of the finger using a touch sensor.

In step 1820, the processor 410 selects the closest point detector 431. The processor 410 may activate the point detector 431 disposed in the portion touched by the finger.

In step 1830, the processor 410 performs scanning using the light source 610 of the first region. For example, the processor 410 may synchronize a light source (e.g., a pixel) disposed in a fingerprint measurement region with the point detector 430 to perform scanning.

In step 1840, the processor 410 compensates for background noise. The processor 410 may perform background calibration depending on each position of the light sources 610.

In step 1850, the processor 410 generates a fingerprint image. The point detector 430 may obtain the amount of the light emitted by illumination patterns sequentially changing at a specified period and reflected by the finger. The processor 410 may form the fingerprint image by deconvolution of the biometric information obtained by the point detector 430.

In step 1860, the processor 410 compares the generated fingerprint image with registered fingerprint information. The processor 410 may compare the registered fingerprint information with measured the fingerprint information through the matching algorithm.

In step 1870, the processor 410 determines whether the fingerprint image matches the fingerprint information. If the fingerprint image matches the fingerprint information (Yes in step 1870), the processor 410 proceeds to step 1880. If the fingerprint image does not match the fingerprint information (No in step 1870), the processor 410 proceeds to step 1890.

In step 1880, the processor 410 unlocks the electronic device 100.

In step 1890, the processor 410 locks the electronic device 100.

Figure 19:
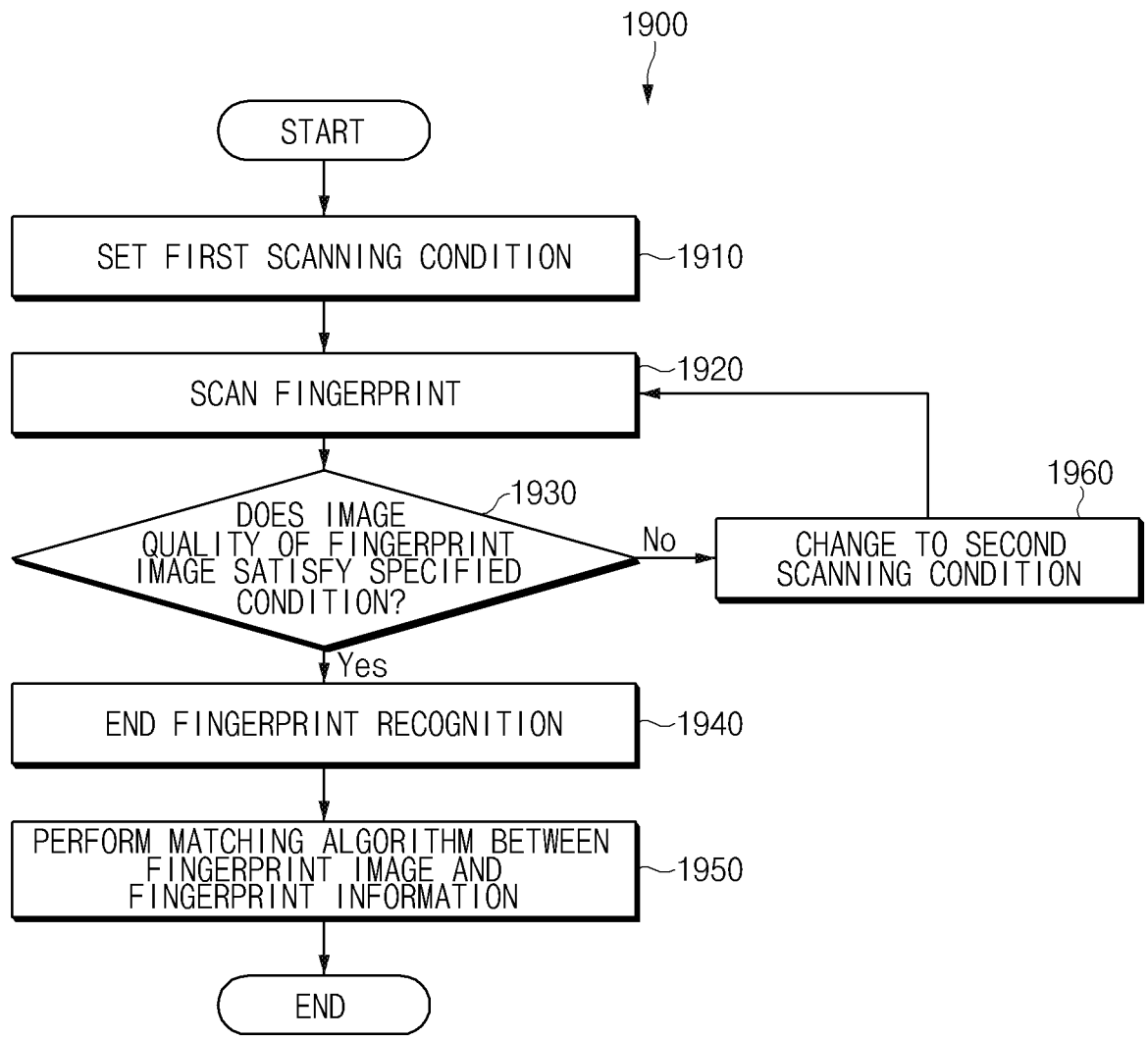
FIG. 19 is a flowchart illustrating a process in which an electronic device sets a scanning resolution when a fingerprint of a user is obtained, according to an embodiment.

FIG. 19 is a flowchart 1900 illustrating a process in which an electronic device 100 sets a scanning resolution when the fingerprint of the user is obtained, according to an embodiment.

In step 1910, a processor 410 sets a first scanning condition. The first scanning condition may include the default scanning resolution, the brightness of the light source 610, the brightness of the display panel 420, the luminance of the light source 610, the color of the light source 610, the first period, and/or the number of activated light sources 610. For example, the processor 410 may set the default scanning resolution, the brightness of the light source 610, the brightness of the display panel 420, the luminance of the light source 610, the color of the light source 610, the first period, and/or the number of activated light sources 610. If a fingerprint measurement is started, the processor 410 may set the default scanning resolution. The default scanning resolution may be the minimum image resolution required by the matching algorithm.

In step 1920, the processor 410 scans a fingerprint.

In step 1930, the processor 410 determines whether or not the image quality of the fingerprint image satisfies a specified condition. The processor 410 may determine whether or not the image quality is sufficient to be used in the matching algorithm. If the image quality of the fingerprint image satisfies the specified condition (Yes in step 1930), the processor 410 proceeds with the process in step 1940. If the image quality of the fingerprint image does not satisfy the specified condition (No in step 1930), the processor 410 proceeds with the process in step 1960.

In step 1940, the processor 410 ends fingerprint recognition. If it is determined that the matching algorithm may be performed with the fingerprint scanned in step 1920, the processor 410 may complete the task of scanning the fingerprint.

In step 1950, the processor 410 performs the matching algorithm between the fingerprint image and the fingerprint information. If it is possible to perform the matching algorithm with the fingerprint scanned in step 1920, the processor 410 may end fingerprint recognition according to step 1940 and then perform the matching algorithm.

In step 1960, the processor 410 changes the first scanning condition to a second scanning condition. For example, the processor 410 may increase the scanning resolution. If a fingerprint image having a finer resolution is required, the processor 410 may obtain a higher resolution fingerprint image by increasing the scanning resolution, and then perform the matching algorithm. In another example, the processor 410 may increase the brightness of the light source 610, increase the brightness of the display panel 420, change the luminance of the light source 610, change the color of the light source 610, increase the number of activated light sources 610, or change the first period (e.g., to be faster or longer).

Figure 20:
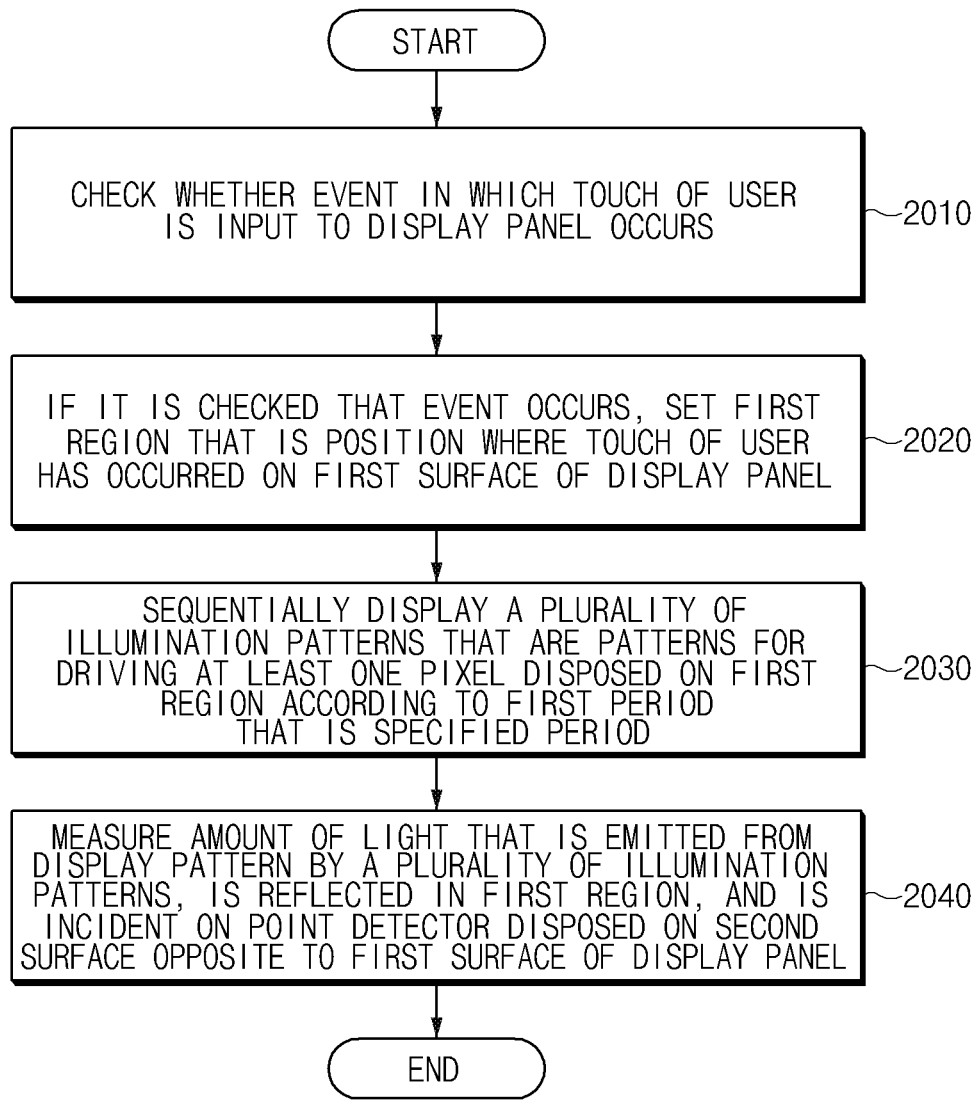
FIG. 20 is a flowchart illustrating a biometric information obtaining method using an electronic device, according to an embodiment.

FIG. 20 is a flowchart illustrating a biometric information obtaining method of an electronic device 100, according to an embodiment.

In step 2010, a processor 410 checks whether an event in which a touch of the user is input to a display panel 420 occurs. A touch sensor may be disposed on the display panel 420 to detect the touch of the user. If the touch of the user is input, the processor 410 may determine the finger of the user as an object 440.

In step 2020, if the event occurs, the processor 410 sets a first region that is a position where the touch of the user has occurred on a first surface of the display panel 420. The processor 410 may set, as a first region, a portion of the first surface of the display panel 420 including a region where the finger of the user touches the display panel 420.

In step 2030, the processor 410 sequentially displays a plurality of illumination patterns that are patterns for driving at least one pixel (e.g., the light source 610 of FIG. 6A) disposed on the first region according to a first period that is a specified period. The processor 410 may set a plurality of illumination patterns such that at least some of the pixels 610 activated for each illumination pattern are different from each other. The processor 410 may change the first period according to the scanning speed and/or resolution.

In step 2040, the processor 410 measures an amount of light that is emitted from the display panel 420 by the plurality of illumination patterns, is reflected by the first region, and is incident on a point detector 430 disposed on a second surface opposite to the first surface of the display panel 420. The processor 410 may determine the surface shape of the object 440 that is in contact with and/or adjacent to the first region based on the amount of light measured by the point detector 430. For example, the processor 410 may determine a ridge and/or a valley corresponding to position coordinates of the finger of the user touching the display panel 420. The processor 410 may accumulate measurement data of the amount of light according to each of the plurality of illumination patterns to scan the entire shape of the fingerprint.

Figure 21:
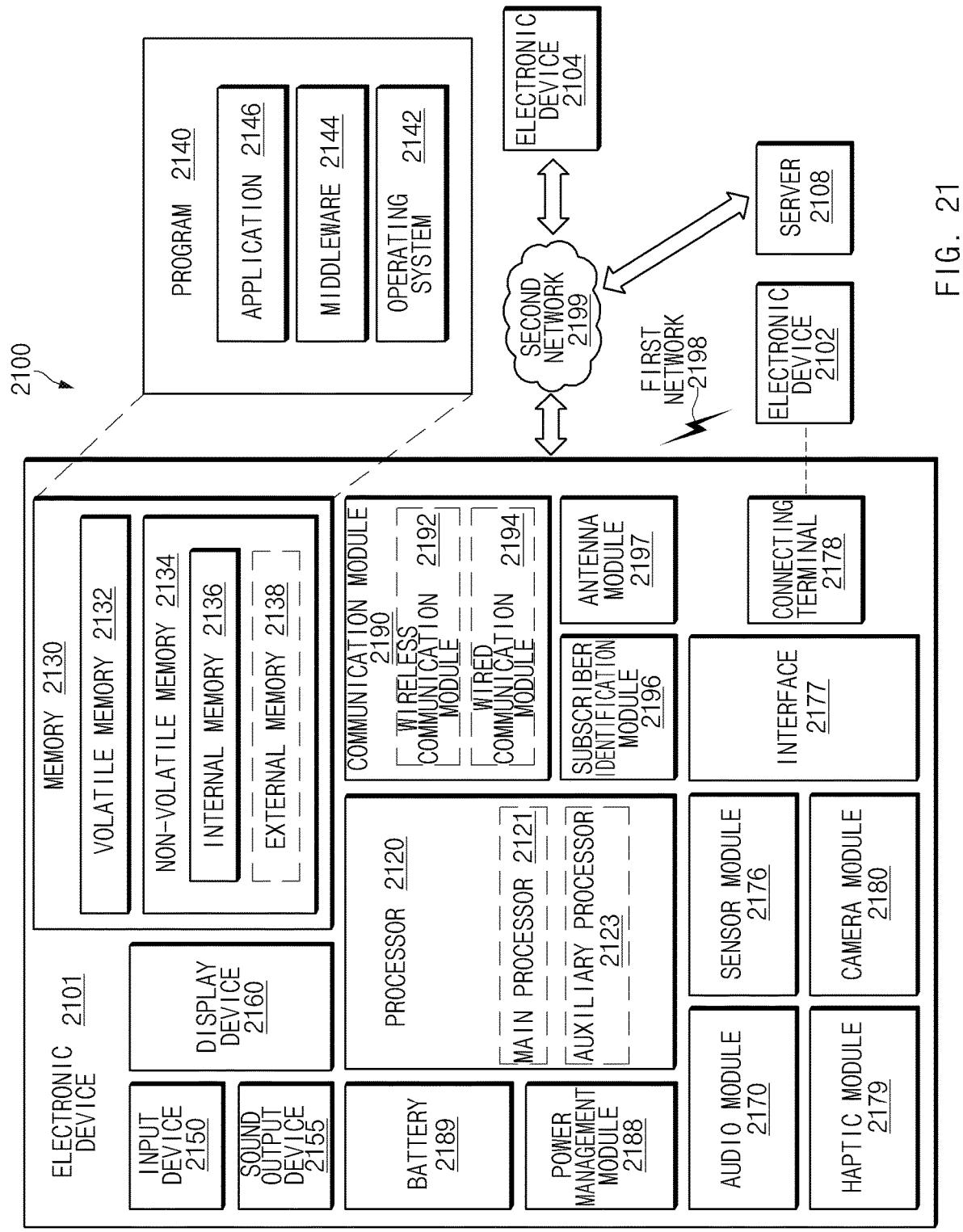
FIG. 21 is a block diagram illustrating an electronic device in a network environment, according to various embodiments.

FIG. 21 is a block diagram illustrating an electronic device 2101 in a network environment 2100 according to various embodiments. Referring to FIG. 21, the electronic device 2101 in the network environment 2100 may communicate with an electronic device 2102 via a first network 2198 (e.g., a short-range wireless communication network), or an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input device 2150, a sound output device 2155, a display device 2160, an audio module 2170, a sensor module 2176, an interface 2177, a haptic module 2179, a camera module 2180, a power management module 2188, a battery 2189, a communication module 2190, a subscriber identification module (SIM) 2196, or an antenna module 2197. In some embodiments, at least one (e.g., the display device 2160 or the camera module 2180) of the components may be omitted from the electronic device 2101, or one or more other components may be added in the electronic device 2101. In some embodiments, some of the components may be implemented as single integrated circuitry. For example, the sensor module 2176 (e.g., a fingerprint sensor, an iris sensor, or an illuminance sensor) may be implemented as embedded in the display device 2160 (e.g., a display).

The processor 2120 may execute, for example, software (e.g., a program 2140) to control at least one other component (e.g., a hardware or software component) of the electronic device 2101 coupled with the processor 2120, and may perform various data processing or computation. According to an embodiment, as at least part of the data processing or computation, the processor 2120 may load a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a CPU or an AP), and an auxiliary processor 2123 (e.g., a GPU, an ISP, a sensor hub processor, or a CP) that is operable independently from, or in conjunction with, the main processor 2121. Additionally or alternatively, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one component (e.g., the display device 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an ISP or a CP) may be implemented as part of another component (e.g., the camera module 2180 or the communication module 2190) functionally related to the auxiliary processor 2123.

The memory 2130 may store various data used by at least one component (e.g., the processor 2120 or the sensor module 2176) of the electronic device 2101. The various data may include, for example, software (e.g., the program 2140) and input data or output data for a command related thereto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input device 2150 may receive a command or data to be used by another component (e.g., the processor 2120) of the electronic device 2101, from the outside (e.g., a user) of the electronic device 2101. The input device 2150 may include, for example, a microphone, a mouse, a keyboard, or a digital pen (e.g., a stylus pen).

The sound output device 2155 may output sound signals to the outside of the electronic device 2101. The sound output device 2155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 2160 may visually provide information to the outside (e.g., a user) of the electronic device 2101. The display device 2160 may include, for example, a display, a hologram device, or a projector and control circuitry to control a corresponding one of the display, hologram device, and projector. According to an embodiment, the display device 2160 may include touch circuitry adapted to detect a touch, or sensor circuitry (e.g., a pressure sensor) adapted to measure the intensity of force incurred by the touch.

The audio module 2170 may convert a sound into an electrical signal and vice versa. According to an embodiment, the audio module 2170 may obtain the sound via the input device 2150, or output the sound via the sound output device 2155 or a headphone of an external electronic device (e.g., an electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, a SD card connector, or an audio connector (e.g., a headphone connector).

The haptic module 2179 may convert an electrical signal into a mechanical stimulus (e.g., a vibration or a movement) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, ISPs, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more CPs that are operable independently from the processor 2120 (e.g., the AP) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth™, wireless-fidelity (Wi-Fi) direct, or infrared data association (IrDA)) or the second network 2199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the subscriber identification module 2196.

The antenna module 2197 may transmit or receive a signal or power to or from the outside (e.g., the external electronic device) of the electronic device 2101. According to an embodiment, the antenna module 2197 may include an antenna including a radiating element composed of a conductive material or a conductive pattern formed in or on a substrate (e.g., PCB). According to an embodiment, the antenna module 2197 may include a plurality of antennas. In such a case, at least one antenna appropriate for a communication scheme used in the communication network, such as the first network 2198 or the second network 2199, may be selected, for example, by the communication module 2190 (e.g., the wireless communication module 2192) from the plurality of antennas. The signal or the power may then be transmitted or received between the communication module 2190 and the external electronic device via the selected at least one antenna. According to an embodiment, another component (e.g., a radio frequency integrated circuit (RFIC)) other than the radiating element may be additionally formed as part of the antenna module 2197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. Each of the electronic devices 2102 and 2104 may be a device of a same type as, or a different type, from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2140) including one or more instructions that are stored in a storage medium (e.g., internal memory 2136 or external memory 2138) that is readable by a machine (e.g., the electronic device 2101). For example, a processor (e.g., the processor 2120) of the machine (e.g., the electronic device 2101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display panel including at least one light source;
a point detector disposed on one surface of the display panel or inside the display panel;
at least one processor operatively connected with the display panel and the point detector,
wherein the at least one processor is configured to:
cause the at least one light source to emit light in response to an object outside the display panel;
detect, through the point detector, at least a portion of the emitted light reflected by at least a portion of the object;
obtain biometric information corresponding to the object based on the detection; and
a memory storing compensation data for compensating for a scattering of the light depending on a position of the light source,
wherein the at least one processor is further configured to compensate for a deviation of the light using the compensation data.

2. The electronic device of claim 1, wherein the at least one processor is further configured to set, as a first region, a region where the object contacts the display panel, and cause the at least one light source disposed on the first region to emit the light.

3. The electronic device of claim 1, wherein the at least one processor is further configured to sequentially display a plurality of illumination patterns every first period or second period, the plurality of illumination patterns being patterns for driving the at least one light source.

4. The electronic device of claim 1, wherein the at least one processor is further configured to cause the point detector to detect an amount of the reflected light, and obtain the biometric information based on the detected amount of the reflected light.

5. The electronic device of claim 1, wherein the at least one processor is further configured to:
emit the light for a first time using a first light source disposed on a first region of the display panel among the at least one light source; and
emit the light for the first time using a second light source disposed on a second region different from the first region.

6. The electronic device of claim 1, wherein a plurality of point detectors including the point detector are disposed on one surface of the display panel at specified intervals, and
wherein the at least one processor is further configured to obtain the biometric information using a point detector among the plurality of point detectors by which the emitted light is detected.

7. The electronic device of claim 1, further comprising a memory storing a registered image of the biometric information and a feature point of the registered image,
wherein the at least one processor is further configured to cause a light source disposed in a region adjacent to the feature point, among the at least one light source, to emit the light.

8. A biometric information obtaining method using an electronic device including a point detector, the method comprising:
emitting light in response to an object outside a display panel by at least one light source included in the display panel;
detecting, through the point detector, at least a portion of the emitted light reflected by at least a portion of the object;
obtaining biometric information corresponding to the object based on the detection; and
compensating for a deviation of the light depending on a position of the display panel by using compensation data for compensating for a scattering of the light depending on the position of the display panel.

9. The method of claim 8, wherein a region where the object contacts the display panel is set as a first region and the at least one light source disposed on the first region emits the light.

10. The method of claim 8, wherein a plurality of illumination patterns are sequentially displayed every first period or second period, and
wherein the plurality of illumination patterns are patterns for driving the at least one light source.

11. The method of claim 8, wherein the point detector detects an amount of the reflected light and obtains the biometric information based on the detected amount of the reflected light.

12. The method of claim 8, further comprising:
setting a first scanning condition;
scanning the object according to the first scanning condition;
determining whether or not the scanning result satisfies a specified condition;
changing the first scanning condition to a second scanning condition if the determination does not satisfy the specified condition; and
performing a matching algorithm for the scanned object if the result satisfies the specified condition.

13. The method of claim 8, wherein a plurality of point detectors including the point detector are disposed on one surface of the display panel at specified intervals, and
wherein the biometric information is obtained using a point detector among the plurality of point detectors by which the emitted light is detected in an entire region of the display panel.

14. A biometric information obtaining method of an electronic device, the method comprising:
checking whether an event in which a touch of a user is input to a display panel;
if the event occurs, setting, as a first region, a position where the touch of the user has occurred on a first surface of the display panel;
sequentially displaying a plurality of illumination patterns for driving at least one pixel disposed on the first region according to a first specified period; and
measuring an amount of light that is emitted from the display panel by the plurality of illumination patterns and reflected by the first region to a point detector disposed on a second surface opposite to the first surface of the display panel,
wherein the first period is changed according to a scanning speed or resolution.

15. The method of claim 14, further comprising:
changing the first period using a refresh rate of a display driver integrated circuit driving the display panel, wherein the first period is reduced in the first region and increased in a second region other than the first region.

16. The method of claim 14, wherein the plurality of illumination patterns include a first pattern and a second pattern, and wherein the second pattern is a pattern in which an additional light source different from at least a portion of the at least one light source activated in the first pattern is activated.

17. The method of claim 14, further comprising:

calculating a point spread function (PSF) based on information on light scattered from the display panel;

obtaining an image related to the biometric information based on an amount of light on the point detector; and obtaining a corrected image by deconvoluting the PSF on the image.

18. The method of claim 14, wherein a registered image of the biometric information and a feature point of the registered image are stored, and wherein a light source disposed in a region adjacent to the feature point among the at least one light source emits the light.

* * * * *